(12) United States Patent  (10) Patent No.: US 8,340,179 B2
Le Leannec et al.  (45) Date of Patent: Dec. 25, 2012

(54) METHODS AND DEVICES FOR CODING AND DECODING MOVING IMAGES, A TELECOMMUNICATION SYSTEM COMPRISING SUCH A DEVICE AND A PROGRAM IMPLEMENTING SUCH A METHOD

(75) Inventors: Fabrice Le Leannec, Mouaze (FR); Xavier Henocq, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1524 days.

(21) Appl. No.: 11/688,679

(22) Filed: Mar. 20, 2007

(65) Prior Publication Data

US 2007/0286508 A1 Dec. 13, 2007

(30) Foreign Application Priority Data

Mar. 21, 2006 (FR) .................................... 06 50974
Dec. 22, 2006 (FR) .................................... 06 11332

(51) Int. Cl.
*H04N 11/02* (2006.01)
(52) U.S. Cl. ................. 375/240.12; 375/240.2; 382/239
(58) Field of Classification Search ............. 375/240.12, 375/240.2; 382/239
See application file for complete search history.

(56) References Cited

U.S. PATENT DOCUMENTS

| | | | |
|---|---|---|---|
| 6,480,541 B1 | 11/2002 | Girod et al. ............... | 375/240.12 |
| 6,996,173 B2 | 2/2006 | Wu et al. | |
| 7,876,833 B2 * | 1/2011 | Segall et al. ............. | 375/240.24 |
| 2004/0006644 A1 | 1/2004 | Henocq et al. ................ | 709/246 |
| 2004/0042549 A1 * | 3/2004 | Huang et al. ............. | 375/240.11 |
| 2004/0184529 A1 | 9/2004 | Henocq et al. ........... | 375/240.01 |
| 2005/0141616 A1 * | 6/2005 | Lim ......................... | 375/240.16 |
| 2005/0195900 A1 * | 9/2005 | Han ........................... | 375/240.21 |
| 2006/0120450 A1 * | 6/2006 | Han et al. .................. | 375/240.03 |
| 2006/0133503 A1 * | 6/2006 | Park et al. ................ | 375/240.16 |
| 2006/0153294 A1 * | 7/2006 | Wang et al. ............... | 375/240.08 |

(Continued)

FOREIGN PATENT DOCUMENTS

EP 1 331 822 A2 7/2003

(Continued)

OTHER PUBLICATIONS

Reichel, Swarz and Wien, "Joint Scalable Video model JSVM 0," Joint Video Team of ISO/IEC MPEG & ITU-T VCEG, Jan. 2005, p. 26.

(Continued)

*Primary Examiner* — Michael Pyzocha
(74) *Attorney, Agent, or Firm* — Fitzpatrick, Cella, Harper & Scinto

(57) ABSTRACT

The method of scalable coding of moving images using at least one reference image for at least one image to code, comprises, at least on passing, for a so-called "current" image, from an initial quality level to an intended quality level different from the initial quality level:

a step (705) of coding the current image as far as the intended quality level to provide a coded current image, a step (710) of reconstructing the current image at the intended quality level to provide a reconstructed current image of intended quality level, a step (715) of obtaining at least one reference image of the current image at the initial quality level, to provide a prediction image for the initial quality level, a step (720, 725) of determining a differential texture refinement depending on the prediction image for the initial quality level and on the reconstructed current image of intended quality level and a step (730) of coding the differential texture refinement.

32 Claims, 10 Drawing Sheets

U.S. PATENT DOCUMENTS

| | | | |
|---|---|---|---|
| 2006/0153295 A1* | 7/2006 | Wang et al. | 375/240.08 |
| 2006/0165176 A1* | 7/2006 | Raveendran et al. | 375/240.16 |
| 2006/0245495 A1* | 11/2006 | Han et al. | 375/240.13 |
| 2007/0127576 A1 | 6/2007 | Henocq et al. | 375/240.16 |
| 2007/0195880 A1 | 8/2007 | Henocq et al. | 375/240.13 |
| 2008/0025399 A1 | 1/2008 | Le Leannec et al. | 375/240.16 |
| 2008/0075170 A1 | 3/2008 | Henocq et al. | 375/240.16 |
| 2008/0095231 A1 | 4/2008 | Onno et al. | 375/240.12 |
| 2008/0130736 A1 | 6/2008 | Onno et al. | 375/240.01 |
| 2008/0144725 A1 | 6/2008 | Henocq et al. | 375/240.27 |
| 2009/0052528 A1* | 2/2009 | Jeon et al. | 375/240.12 |

FOREIGN PATENT DOCUMENTS

| | | |
|---|---|---|
| EP | 1 638 333 A1 | 3/2006 |
| WO | WO 02/054776 A1 | 7/2002 |

OTHER PUBLICATIONS

X. Sun et al., "Efficient and flexible drift-free video bitstream switching at predictive frames", Multimedia and Expo, 2002, IEEE International Conference on Lausanne, Switzerland, vol. 1, Aug. 26, 2002, pp. 541-544.

F. Wu et al., "Efficient and universal scalable video coding", 2002 International Conference on Image Processing, IEEE vol. 2 of 3, Sep. 22, 2002, pp. 37-40.

C. Zhu et al., "Reducing drift for FGS coding based on mulitframe motion compensation", Acoustics, Speech, and Signal Processing, 2004, IEEE International Conference on Montreal, Quebec, Canada, May 15, 2004, pp. 253-356.

Y. Bao et al., "Improvements to Fine Granularity Scalability for Low-Delay Applications", Joint Video Team (JVT) of ISO/IEC MPEG & ITU-T VCEG (ISO/IEC JTC1/SC29/WG11 and ITU-T SG16 Q.6), 15$^{th}$ Meeting: Busan, Korea, Apr. 18, 2005, pp. 1-8, available at http://ftp3.itu.ch/av-arch/jvt-site/2005_04_Busan.

F. Le Leannec et al., "FGS coding allowing switching between FGS layers with reduced drift", Joint Video Team (JVT) of ISO/IEC MPEG & ITU-T VCEG (ISO/IEC JTC1/SC29/WG11 and ITU-T SG16 Q.6), 19$^{th}$ Meeting: Geneva, Switzerland, Mar. 31, 2006, pp. 1-12, available at http://ftp3.itu.ch/av-arch/jvt-site/2006_04_Geneva/JVT-S019.doc.

F. Le Leannec et al., "CE3 response: switching between FGS layers", Joint Video Team (JVT) of ISO/IEC MPEG & ITU-T VCEG (ISO/IEC JTC1/SC29/WG11 and ITU-T SG16 Q.6), 20$^{th}$ Meeting: Klagenfurt, Austria, Jul. 15, 2006, pp. 32, available at http://ftp3.itu.ch/av-arch/jvt-site/2006_07_Klagenfurt/JVT-T029.doc.

Gary Sullivan, et al., "Text of ISO/IEC 14496 10 Advanced Video Coding 3rd Edition", Jul. 2004.

Julien Reichel, et al., "Scalable video Coding—Working Draft 1", Jan. 17-21, 2005.

Heiko Schwarz, et al., "Comparison of MCTF and closed-loop hierarchical B pictures", Jul. 23-29, 2005.

Yiliang Bao, et al., "Implementation of close-loop coding in JSVM", Jul. 24-29, 2005.

Woo-Jin Han, et al., "PFGS with bi-linear interpolation filter", Jul. 24-29, 2005.

Julien Reichel, et al., "Scalable Video Coding—Join Draft 4", Oct. 2005.

Yiliang Bao, et al., "CE7 Report, FGS coding for low-delay applications", Oct. 14-21, 2005.

* cited by examiner

METHODS AND DEVICES FOR CODING AND DECODING MOVING IMAGES, A TELECOMMUNICATION SYSTEM COMPRISING SUCH A DEVICE AND A PROGRAM IMPLEMENTING SUCH A METHOD

The present invention concerns a method and a device for coding moving images, a method and a device for decoding moving images, a telecommunication system comprising such a device and a program implementing such a method. It applies, in particular, to hierarchical or scalable video compression, in the SNR (signal to noise ratio) dimension, that provides the functionality of progressive coding of the texture information. The present invention thus applies, in particular, to the case of the SVC (scalable video coding) system in course of standardization. It also applies to the scalable video coding comprising the possibility of coding samples representative of the texture in a progressive and nested manner, via technologies of nested quantization and coding by bit plane, for example.

The future standard of video compression known as SVC provides for the provision of a scalable video representation, i.e. with different levels evaluated using three criterion, or dimensions: the signal/noise ratio, known as SNR which defines the point to point quality of the coding, the temporal resolution, i.e. the number of images per second represented by the coded data and the spatial resolution, i.e. the number of image points represented by the coded data.

As regards the SNR scalability, a refinement or enhancement layer, of SNR type contains data useful for decompressing a video sequence at a higher quality level than that of the layer below in the video representation hierarchy.

A SNR refinement may take two forms:

a refinement layer of CGS (coarse grain scalability) type contains both refinement data of the motion data and refinement data of the texture data. A CGS quality layer combines not only the motion compensated temporal prediction within that layer, but also the predictive coding of the motion and texture data from its base layer and a refinement layer of FGS (fine grain scalability) type contains solely data for progressive refinement of the texture information. One or more successive FGS quality layers may be coded above a base layer, a spatial scalability layer or a CGS layer. Typically, means for nested quantization and progressive coding of the DCT (Discrete Cosine Transform) coefficients makes it possible to provide a nested FGS bitstream, adapted to be truncated at any position and progressively increasing the quality of the entirety of the image considered. More particularly, the quantization step size which was attributed to the texture data of the preceding quality layer is divided by two and the associated data are requantized with the new quantization step size of the current FGS layer.

Furthermore, the FGS coding produces portions of compressed bitstream adapted to be truncated at any location. The segment of the bitstream thus truncated is still decodable and its decoding yields a quality refinement of the entirety of the images considered. This property results from the cyclic coding of the DCT coefficients of the different macroblocks employed in the FGS technology.

The FGS technology provides a practical and efficient means for achieving rate control in an SVC transmission system: when the available passband between a coder and a decoder so permits, the coder may send the data of a supplementary level of quality. Conversely, when it is desired to reduce the passband consumed, the coder no longer sends the data representing the highest level of quality.

The temporal prediction involves two steps: motion estimation and motion compensation, that are known to the person skilled in the art. Recent studies show that the best compression performances are obtained when the temporal prediction loop operates in the mode termed "closed loop".

Concerning the motion estimation, the approach known as "closed loop" consists of estimating the motion vectors between an original image to compress and the reconstructed version (coded then decoded) of a reference image. As concerns the motion compensation, the closed loop approach consists of calculating the prediction error between an original block and the reconstructed version of its motion compensated reference block. Furthermore, when several quality layers of FGS type are generated in the SVC bitstream, according to these studies, the best compression performances are obtained when a motion compensation is used in the coding of each FGS quality level. This is because the closed loop coding has the property of compensating for the distortion of the quantization which was introduced into the reference images. It also ensures the synchronization between the coder and decoder when the video is decoded at a constant level of quality, the term synchronization meaning that the coder and the decoder use identical reference images in the temporal prediction process.

When the FGS technology is used for the purposes of rate control to transmit a pre-coded SVC stream, the compressed video stream server may need to modify its transmission rate according to a variable passband. Unfortunately, the fact of passing from one quality layer to another ends the synchronization between the coder and the decoder. This is because, during the phase of modifying the transmission rate, the decoder reconstructs different reference images from those which had been decoded by the coder at the time of the coding preceding the transmission phase. A defect, termed "drift" is introduced, which leads to the images reconstructed by the decoder being different from those reconstructed by the coder. This results in a reduction in the visual quality displayed with respect to that which should be displayed by the decoder. Furthermore, this drift is propagated over several images, due to the temporal prediction loop.

A method of temporal prediction termed "leaky prediction technique" is known. This method consists of forming a reference image combining the elements of the reference image of the current image in the current FGS quality level with elements of the basic image of the current image. Thus, this method reduces but does not eliminate the drift linked to the partial decoding of FGS layers.

A technique has also been proposed for motion compensation with a particular method of forming the reference image used for the motion compensation in closed loop. This method consists of applying an interpolation to the difference between the reference image of the current image in the current FGS layer, and the reference image of the current image in the base layer, then of adding the result to the reference image in the base layer to form the reference image used for the current image in the current FGS layer. This method improves the quality of the reference image used for the coding of the current image in the current FGS refinement layer. However, this method which reduces the potential drift that may occur in case of partial decoding of a refinement layer of FGS type, does not eliminate that drift.

The present invention aims to remedy these drawbacks. In particular, the present invention aims to avoid the desynchronization which may result from an increase or a reduction in FGS quality level. The object of the invention is also to allow the fluctuations in passband in the case of transmission and rate control of an SVC stream that is scalable in the SNR dimension, while keeping the decoder synchronized with the coder.

According to the present invention, an item of texture differential information is coded and inserted, which makes it possible to pass from one quality level to another, while keeping the decoder synchronized with the coder. The present invention provides a method of coding the residual information making it possible to switch between different levels of quality during the decoding of a stream, in particular an SVC scalable bitstream, without losing the synchronization of the decoder with the coder. Preferably, the coding of the texture refinement information is compatible with the FGS coding syntax specified in the draft SVC standard. No modification of the structure of the decoder is thus necessary, which is an advantage of the present invention. Preferably, the item of texture differential information is thus only transmitted in the case of an increase or a decrease in the number of quality levels transmitted.

According to a first aspect, the present invention concerns a method of scalable coding of moving images using at least one reference image for at least one image to code, that comprises, at least on passing, for a so-called "current" image, from an initial quality level to an intended quality level different from the initial quality level:
  a step of coding the current image as far as the intended quality level to provide a coded current image,
  a step of reconstructing the current image at the intended quality level by using the coded current image and at least one reference image for the intended quality level, to provide a reconstructed current image of intended quality level,
  a step of obtaining at least one reference image of the current image at the initial quality level, to provide a prediction image for the initial quality level,
  a step of determining a differential texture refinement depending on the prediction image for the initial quality level and on the reconstructed current image of intended quality level and
  a step of coding the differential texture refinement.

Thus, by processing the texture refinement, the decoder may determine that difference and implement it on the reconstructed reference image at the initial quality level for determining the reconstructed current image at the intended quality level. Thus, the decoder is immediately synchronized with the coder for the following images to reconstruct. In other words, the invention provides a solution making it possible to decode an image P at a given FGS quality level while only possessing the basic image of the current image, the reference image reconstructed at a lower quality level than the desired FGS quality level and an additional texture refinement.

According to particular features, the step of determining the differential texture refinement comprises
  a step of reconstructing a prediction residue of the current image as far as the initial quality level and
  a step of determining a difference between the current image reconstructed at the intended quality level, and the sum of the prediction image at the initial quality level and said residue.

According to particular features, the step of determining the differential texture refinement comprises:
  a step of reconstructing the current image by using said coded current image and each prediction image for the initial quality level, to provide a hybrid reconstructed current image and
  a step of determining difference between the reconstructed current image at the intended quality level and the hybrid reconstructed current image, for determining a differential texture refinement.

According to particular features, the step of reconstructing a hybrid reconstructed current image comprises a step of reconstructing a temporal prediction error image for the current image as far as the initial quality level by using the reference image of the current image at the initial quality level.

According to particular features, the method as succinctly set forth above comprises a step of temporal prediction, during the step of coding the current image, during the reconstruction step and during the obtaining step.

According to particular features, said temporal prediction step includes a step of obtaining motion vectors associated with macroblocks of the image and a step of motion compensation of the associated reference macroblocks.

According to particular features, the step of obtaining the prediction image comprises a step of obtaining motion vectors associated with macroblocks of the current image and a step of motion compensation for the macroblocks of each prediction image at the initial quality level.

According to particular features, during the step of coding the texture refinement, a texture refinement signal is coded using coding compatible with the FGS coding syntax specified in the draft SVC standard.

According to particular features, during the step of coding the texture refinement, the texture refinement code comprises discrete cosine transformation coefficients representing said texture refinement.

According to particular features, the method as succinctly set forth above comprises a step of transmitting, from a coder to a decoder, the texture refinement code, said transmitting step only being performed at the time of an increase or reduction in the number of quality levels transmitted.

The invention briefly described above is typically applied to P-type images of the SVC compression system. It can also be used for purposes of resistance to transmission errors that may arise for example on a transmission network with packet loss, such as the internet. However, the invention briefly described above is limited in that it generates a signal allowing change from an initial quality level to a single target quality level.

According to particular features, the method as briefly described above comprises steps according to which, for at least one current quality level of a plurality of quality levels higher than the initial quality level, each quality level in the plurality of quality levels containing solely progressive refinement data of the texture information:
  (a) the last coded passage signal is decoded, so as to obtain a residual signal, and the current image is reconstructed by adding the residual signal and its associated prediction image;
  (b) the current image is reconstructed by decoding a quality level higher than the current quality level;
  (c) the difference between the current image reconstructed at step (a) and the current image reconstructed at step (b) is calculated, so as to obtain residual data;
  (d) this residual data is coded so as to obtain a signal for passing between the initial quality level and the quality level higher than the current quality level.

Thus, it is possible to pass from a single starting quality level to several possible higher quality levels, and this by ensuring a more rapid resynchronization of the SVC decoder with the coder than in the current SVC standard.

In a particular embodiment, steps (a) to (d) are performed for each current quality level in the plurality of quality levels.

This thus offers the possibility of switching from the initial quality level to each of the quality levels in the plurality of quality levels.

In a particular embodiment, the quality level higher than the current quality level is directly higher than the current quality level.

This allows switching to all the quality levels higher than the initial quality level present in the scalable video stream in question. This also makes it possible to obtain better performance in terms of rate/distortion compromise.

According to a particular characteristic, each passage signal is coded with a quantization step divided by $2^p$ with respect to the quantization step used in the previous passage signal, where p is the number of successive quality levels between the higher quality level and the current quality level.

This characteristic has in particular the advantage of providing a coded passage signal with a quantization step equal to the quantization step used in the coding of the higher quality level. Thus, the passage signal makes it possible to best approach the current image reconstructed at the quality level targeted by this passage signal.

In a particular embodiment, the hierarchical coding is in accordance with the SVC (Scalable Video Coding) standard and the quality levels in the plurality of quality levels are refinement quality levels of the FGS (Fine Grain Scalability) type.

According to a second aspect, present invention concerns a device for scalable coding of moving images using at least one reference image for at least one image to code, which comprises:
- a means for coding a so-called "current" image, on the basis of which passage is made from an initial quality level to an intended quality level different from the initial quality level, adapted to code the current image as far as the intended quality level to provide a coded current image,
- a means for reconstructing the current image at the intended quality level by using the coded current image and at least one reference image for the intended quality level, to provide a reconstructed current image of intended quality level,
- a means for obtaining at least one reference image of the current image at the initial quality level, to provide a prediction image for the initial quality level,
- a means for determining a differential texture refinement depending on the prediction image for the initial quality level and on the reconstructed current image of intended quality level and
- a means for coding the differential texture refinement.

According to particular features, the coding means is adapted to code a video sequence with several quality levels, and in that the refinement means comprise:
- a first means for inverse quantization of the current image at each quality level which would be decoded if the decoder was synchronized with the coder in that quality level,
- a second means for inverse quantization adapted to perform an inverse quantization of the reference image at a second quality level different from the quality level used by the first means for inverse quantization and to perform an inverse quantization of the residual signal for the current image as far as the second quality level,
- a means for subtraction between the version of the current image after inverse quantization by the first means for inverse quantization, and the sum of the reference image after inverse quantization at the second quality level and of the residual signal after inverse quantization as far as the second quality level and
- a means for quantization and coding of data arising from the first inverse quantization performed by the first inverse quantization means and for inserting into the code said data of a residual signal arising from the subtraction performed by the subtraction means.

According to particular features, the device as briefly described above comprises a module adapted, for at least one current quality level in a plurality of quality levels ($l_1, \ldots, l_{N-1}$) higher than the initial quality level ($l_0$), each quality level in the plurality of quality levels containing solely progressive refinement data of the texture information:

(a) to decode the last coded passage signal, so as to obtain a residual signal, and to reconstruct the current image by adding the residual signal and its associated prediction image;

(b) to reconstruct the current image by decoding a quality level higher than the current quality level;

(c) calculating the difference between the current image reconstructed at step (a) and the current image reconstructed at step (b), so as to obtain residual data;

(d) coding this residual data, so as to obtain a passage signal between the initial quality level and the quality level higher than the current quality level.

According to a third aspect, the present invention concerns a method of scalable decoding of moving images using at least one reference image for at least one image to decode, that comprises, at least on passing, for a so-called "current" image, from an initial quality level to an intended quality level different from the initial quality level:
- a step of decoding a differential texture refinement representing a difference between a prediction image for the initial quality level and the reconstructed current image of intended quality level and
- a step of reconstructing the current image at the intended quality level by using at least one reference image for the initial quality level and the differential texture refinement.

According to particular features, the step of reconstructing the current image comprises a step of decoding and of inverse quantization of a temporal prediction residue as far as the initial quality level.

According to particular features, the step of reconstructing the current image comprises a step of decoding and of inverse quantization of the differential texture refinement.

According to particular features, the step of reconstructing the current image comprises a step of adding the temporal prediction residue and the decoded differential signal.

According to particular features, the step of reconstructing the current image comprises a step of inverse transformation of the result of said adding step to provide a decoded temporal residue.

According to particular features, the step of reconstructing the current image comprises a step of adding the decoded temporal residue and the corresponding reference block.

According to a fourth aspect, present invention concerns a device for scalable decoding of moving images using at least one reference image for at least one image to decode, that comprises:
- a decoding means adapted to decode a differential texture refinement representing a difference between a reconstructed current image of intended quality level and a prediction image for the initial quality level, said current image being an image on the basis of which passage is made from an initial quality level to an intended quality level different from the initial quality level, and a means for reconstructing the current image at the intended quality level which is adapted to use at least one reference image for the initial quality level and the differential texture refinement.

According to a fifth aspect, the present invention concerns a telecommunications system comprising a plurality of terminal devices connected via a telecommunications network, that comprises at least one terminal device equipped with a coding device as succinctly set forth above and at least one terminal device equipped with a decoding device as succinctly set forth above.

According to a sixth aspect, the present invention concerns a computer program containing instructions enabling the implementation of the coding method as succinctly set forth above, when that program is loaded and executed by a computer system.

According to a seventh aspect, the present invention concerns a computer program containing instructions enabling the implementation of the decoding method as succinctly set forth above, when that program is loaded and executed by a computer system.

According to a eighth aspect, the present invention concerns an information storage means that can be read by a computer or a microprocessor storing instructions of a computer program, that permits the implementation of a coding method as briefly described above.

As the advantages, objects and particular features of that decoding method, of those coding and decoding devices, of that telecommunication system, of those computer programs and of that information storage means are similar to those of the encoding method, as succinctly set forth above, they are not repeated here.

Other advantages, objects and features of the present invention will emerge from the following description, given, with an explanatory purpose that is in no way limiting, with respect to the accompanying drawings in which:

FIG. 1 is a diagram of a particular embodiment of a coding device of the present invention, FIG. 2 is a diagram of a multi-layer organization possible with SVC, FIG. 3 illustrates the hierarchical SVC representation of FIG. 2, in which refinement layers of FGS type have been added, FIG. 4 is a diagram of a conventional video decoder, typically representative of the H264/AVC video compression standard, FIG. 5 is a diagram of the insertion of the step of decoding the FGS refinement layers in the decoder illustrated in FIG. 4, FIG. 6 is a diagram of the display quality levels linked to the coding and decoding of a sequence of images with incrementation of the quality level, FIG. 7 is a logigram representation of the steps implemented in a particular embodiment of the coding method of the present invention, FIG. 8 is a representation in the form of a logigram of the steps implemented in one of the steps illustrated in FIG. 7 and FIG. 9 is a representation in the form of a logigram of the steps implemented in a particular embodiment of the decoding method of the present invention.

Before describing the present invention, a reminder is given below, in relation to FIGS. 2 to 6, of the principles of the multi-layer representations of a video sequence with scalable video coding (SVC).

In the whole description, the terms "residue" and "coding error" designate, in the same way, the same thing. Similarly, the terms "formation", "coding" and "compression" designate the same functions which apply to an image. The terms "decoding", "reconstruction" and "decomposition" are equivalent.

The SVC video compression system provides scalabilities in the temporal, spatial and SNR (quality) dimensions. The temporal scalability is obtained via the hierarchical B images in the base layer, or else, by virtue of MCTF (Motion Compensated Temporal Filtering), not described here, in the refinement layers. The SNR scalability exists in two forms. Fine SNR scalability, denoted FGS, is obtained by progressive quantization of "slices", which each form a set of macroblocks that are coded (and decoded) independently of the macroblocks of the other slices.

The coarse SNR scalability or CGS is provided by the coding of a layer in which temporal decomposition into hierarchical B images or else an MCTF operation is performed independently of the lower layer, and which is predicted from the layer directly below. Finally, the spatial scalability is obtained by predictive coding of a layer in which temporal decomposition into hierarchical B images or an MCTF operation is performed independently of the lower layer. The coding of a spatial refinement layer is similar to that of a CGS layer, except that it serves to compress the video sequence at a higher resolution level than the lower layer. It includes among others a step of spatial upsampling in both spatial dimensions (width and height) in the inter layer prediction process.

Figure 2:
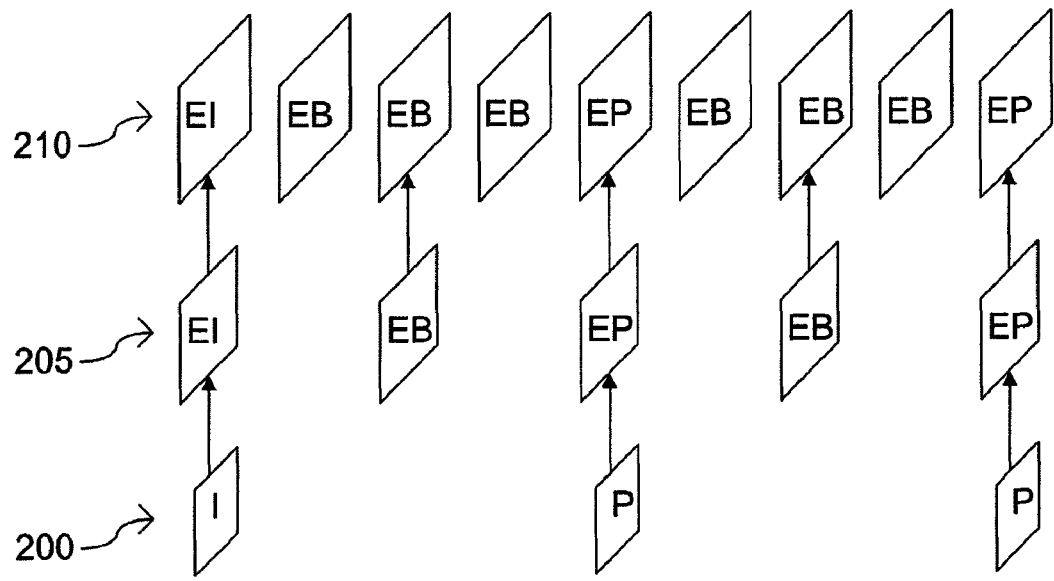

FIG. 2 illustrates an example of multi-layer organization possible with SVC. The base layer 200 represents the sequence of images at its lowest spatial resolution level, compressed in a manner compatible with the H264/AVC standard. As illustrated in FIG. 2, the base layer 200 is composed of images of I, P and hierarchical B type, notations which cover their improved versions EI, EP and EB.

The hierarchical B images constitute a means for generating a scalable base layer in the temporal dimension. They are denoted $B_i$, $i \geq 1$, and follow the following rule: an image of type $B_i$ may be temporally predicted on the basis of the anchoring images, which are I or P type reference images which appear at the boundaries of the group of images processed (known as a Group of Pictures), surrounding it, as well as the $B_j$, j<i images, located in the same range of I or P anchoring images. It is observed that between the anchoring images, images of B type are to be found. It is also observed that a $B_1$ image, that is to say the first image of a sequence, can only be predicted on the basis of the anchoring images surrounding it since there is no image Bj with j<i.

In the whole of the rest of the description, consideration is limited to the case in which the reference image is constituted by the preceding reconstructed image of the same quality level. However, on the basis of the following description, the person skilled in the art knows how to implement the present invention in other cases in which the reference image or images are different from the preceding reconstructed image of same quality. The scope of the present invention is thus not limited to this last case.

In FIG. 2, two spatial refinement layers, 205 and 210, are illustrated. The first spatial refinement layer 205 is coded predictively with respect to the base layer 200, and the second spatial refinement layer 210 is predicted from the first spatial refinement layer 205. A step of spatial oversampling which oversamples with a double coefficient occurs during those inter layer predictions, such that a higher layer contains images of which the definitions are, in each dimension, double those of the layer immediately below.

Figure 3:
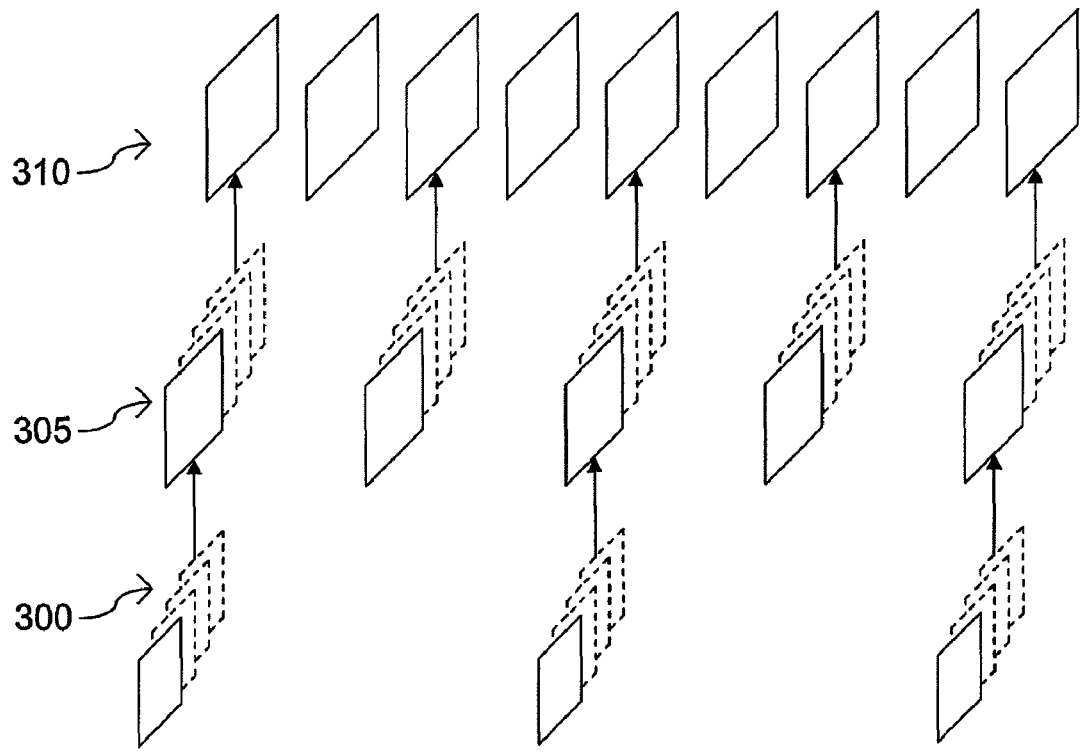

FIG. 3 illustrates the hierarchical SVC representation of FIG. 2, in which refinement layers 300 and 305 of FGS type have been added. An FGS refinement layer consists of the quality refinement of the texture information. This texture information corresponds either to an error, or residue, of temporal prediction, or to an error, or residue, of spatial prediction, or to a texture coded in Intra without prediction. A scalability layer of FGS type provides a quality refinement of the texture information concerned, with respect to the layer below. This quality refinement is progressive, that is to say that the segment of bitstream arising from the FGS coding may be truncated at any point. The result of this truncation remains decodable and provides a representation of the whole image considered at a quality level which increases with the length of the decoded bitstream. The bitstream generated by the FGS coding is also said to be "progressive in quality" or "nested".

These two worthwhile properties of FGS coding (quality refinement and progressiveness of the bitstream) are obtained by virtue of the following two coding tools:

progressive quantization: the quantization parameter attributed to a given FGS refinement layer is such that the quantization step size applied to the DCT coefficients is divided by them with respect to the layer below;

the cyclic coding of the DCT coefficients of the different blocks of an image: the order of coding of the DCT coefficients of an image is a function of the amplitude of the different DCT coefficients. The coefficients of greatest amplitude appear first in the bitstream. More particularly, a "significance pass" indicates the coefficients that are significant with respect to an amplitude threshold. Next, an amplitude refinement pass makes it possible to code refinements of amplitude values of the coefficients already coded as significant. The macroblocks thus no longer appear in the bitstream in their natural scanning order, as in the coding of the other SVC layers. On the contrary, the DCT coefficients of the different blocks are interlaced and their order is a function of their respective amplitude. This cyclic coding, designated by the term "progressive refinement" in the draft SVC standard, ensures the property of nesting of the FGS bitstream, that is to say the possibility of truncating it at any point, while leaving it to be capable of being decoded, each supplementary quality layer providing a quality increment spatially covering the whole of the image considered.

Figure 4:
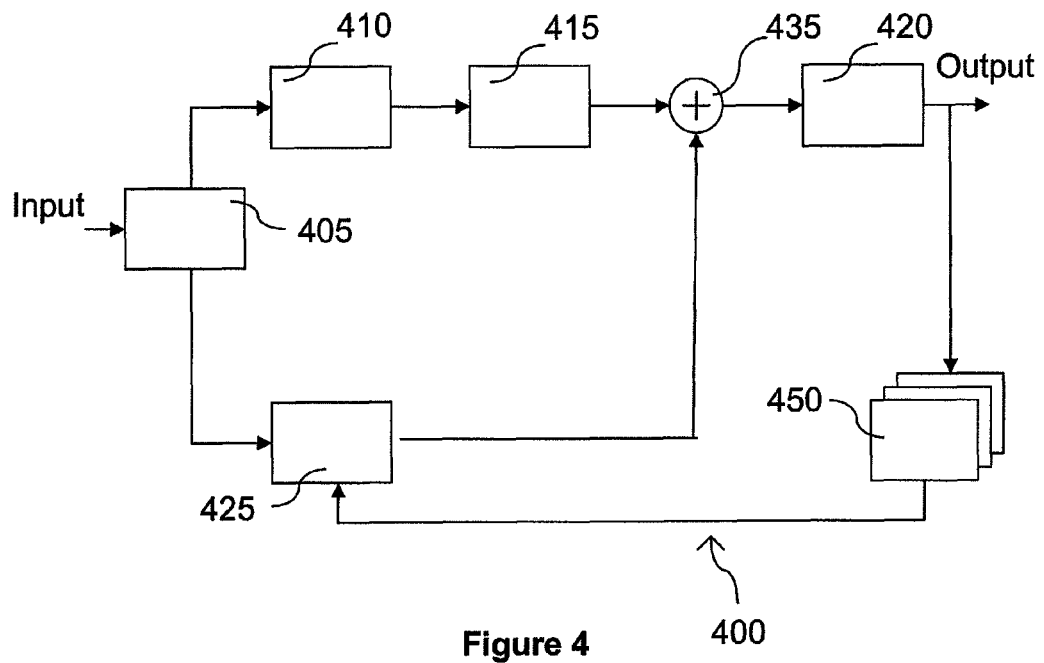
Figure 5:
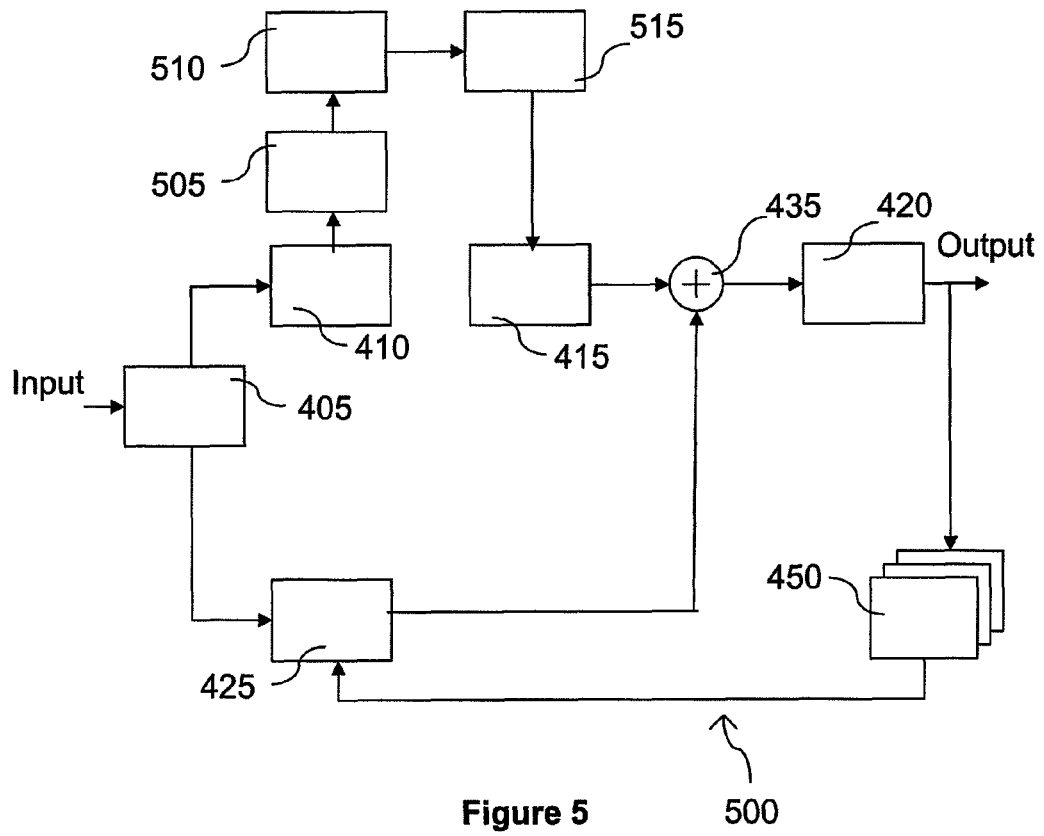

FIGS. 4 and 5 illustrate how the processing of the SVC refinement layers is situated within a video decoding algorithm. FIG. 4 illustrates a conventional video decoder 400, that is typically representative of the H264/AVC video compression standard, Such a decoder includes, in known manner, the application to each macroblock of the successive functions of entropy decoding, functional block 405, of inverse quantization, functional block 410, and of inverse transformation, functional block 415. The residual information arising from these first three operations is next added to a reference macroblock for its spatial or temporal prediction. The image resulting from this prediction finally passes through a deblocking filter 420 reducing the block effects. The image thus reconstructed is both adapted to be displayed, as well as to be stored in a list 450 of reference images. It is, more particularly, made to serve as reference image for the temporal prediction, functional block 425, for the next images to decode of the compressed bitstream, the image resulting from the temporal prediction 425 being added to the image arising from the inverse transformation 415 through an adder 435.

FIG. 5 illustrates the insertion of the functions of decoding of the FGS refinement layers in a decoder 500 comprising all the functions of the decoder 400 illustrated in FIG. 4. As illustrated in FIG. 5, the decoding of the progressive refinement layers of FGS type, functional blocks 505, 510 and 515, is subsequent to the function of inverse quantization 410, successively applied to all the macroblocks of the current image. The FGS decoding provides, over the whole image, a refinement of the values of the samples after inverse quantization. Consequently, as illustrated in FIG. 5, the FGS decoding provides a progressive refinement of the spatial or temporal prediction error. This refined prediction error next passes via the same functions as in the decoder 400 of FIG. 4.

A progressive refinement of FGS type thus provides a refinement of the values of the texture samples representing a spatial or temporal prediction error. It is observed that no refinement of the motion information is transported by an FGS quality layer. The motion vectors associated with each temporally predicted macroblock are transported by the base layer above which the FGS layers are added. In other words, to reconstruct a temporally predicted macroblock, the motion vector used during the motion compensation by the decoder is unchanged whatever the quality level at which the decoder considered operates.

Consequently, at the coder, the coder is responsible for generating a unique motion field which will then be used for the motion compensation in the base layer (base layer H264, spatial or CGS), as well as in all the FGS layers above that base layer.

Figure 6:
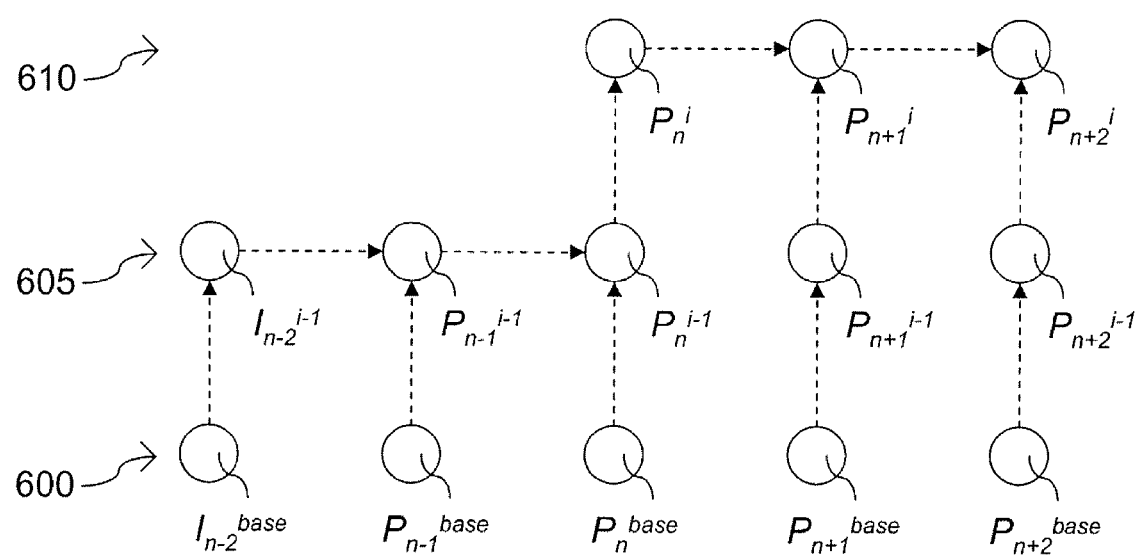

FIG. 6 illustrates images in an SVC video stream. In FIG. 6, a base layer 600 can be seen, which represents an SVC layer of spatial scalability, CGS or the base layer compatible with H264/AVC. The images of this base layer 600 are denoted $l_n^{base}$ and $p_n^{base}$ where the index n represents the index, or number, of the image, the exponent base indicates that the image belongs to the base layer 600, and l or P represent the type of the image. Note that the B images may be inserted between the l images and the P images but have been omitted in FIG. 6 since the present invention more comfortably concerns the coding of the P images. Moreover, refinement layers FGSi-1 605 and FGSi 610 are also illustrated in FIG. 6. An image of a refinement layer is denoted $l_n^i$ or $P_n^i$ according to its l or P type, the index n representing the index, or number, of the image considered and the exponent i representing the index, or number, of the FGS layer considered.

As mentioned above, during the process of temporal prediction of the macroblocks of an image P, the coder must perform a motion estimation. Take for example the example of the coding of the image $P_{n-1}^{base}$ illustrated in FIG. 6. For each macroblock of the image $P_{n-1}^{base}$, the motion estimation provides a motion vector linking it to a reference macroblock belonging to the image $l_{n-2}^{base}$. This motion vector is next used in the motion compensation step in order to generate a prediction error macroblock, also termed residue or residual macroblock. This residual macroblock is next coded by quantization, transformation and entropy encoding. Furthermore, the image $P_{n-1}^{i}$ is coded by refinement of the quantization applied to the residual macroblocks of the image $P_{n-1}^{base}$, then cyclic coding.

Several strategies may be employed by the coder for the motion estimation used, without however modifying the decoding algorithm. The following strategies have been explored by the SVC standardization committee.

the motion estimation in open loop, which consists of estimating, for each macroblock of an original image to code, a vector of motion between that macroblock and a macroblock of a reference image in its original version. The open loop motion estimation thus operates between original images of the sequence to be compressed;

the motion estimation in closed loop, which consists of estimating the motion vectors between an original image and a reconstructed version of the reference image used.

In the technical contributions to the SVC committee, it was proposed to use the reference image reconstructed at the highest FGS quality level to perform the motion estimation in closed loop.

Studies show that the best performances are obtained by performing the motion estimation in closed loop, between the original image to code and the reference image or images decoded at the highest FGS rate level. This is because the fact of working in closed loop makes it possible to take into account the distortions introduced during the quantization of the reference images. Note that one of those studies also leads to the conclusion that the best compression performances are obtained by performing, in addition, the motion compensation also in closed loop at the coder. The motion compensation in closed loop consists of calculating the temporal prediction error macroblocks by calculating the difference between an original macroblock to code and the reference macroblock reconstructed at the same FGS quality level. This configuration of the FGS coder leads to the best performances for all the FGS quality levels.

In turn, at the decoder, consider the case in which it is desired to decode the sequence at the quality level corresponding to the FGS1 layer. In this case, the decoder first of all decodes the image $1_{n-2}^{base}$. It next decodes the texture refinement contained in the FGS1 layer to reconstruct the image $1_{n-2}^{1}$. Next, the decoder decodes the image $P_{n-1}^{1}$. As set forth with respect to FIG. 5, this decoding comprises the reconstruction of a temporal prediction error signal which is added to the reference blocks of the current macroblock that were motion compensated beforehand. More particularly, for each macroblock of the image $P_{n-1}^{1}$ prediction error blocks are progressively reconstructed, first by decoding the texture signal contained in the compressed image $P_{n-1}^{base}$, then by refining that texture signal by decoding the compressed refinement signal $P_{n-1}^{1}$. A reconstructed prediction error signal is thus provided by this scalable decoding. Next, it is added to the motion compensated reference blocks calculated by virtue of the motion vectors contained in the compressed image $P_{n-1}^{base}$ and by applying those motion vectors to the reconstructed reference image $1_{n-2}^{1}$. This provides the reconstructed version of the image $P_{n-1}^{1}$ at the decoder.

It is observed that, when the coder performs the motion compensation step in closed loop, the reconstructed image $P_{n-1}^{1}$ is identical at the coder and at the decoder. Consequently, the decoder has a reference image identical to that used by the coder for the temporal prediction of the following images in the video sequence at the quality level corresponding to the layer FGS1. It is also said that the decoder is perfectly "synchronized" with the coder. The quality of the reconstructed images obtained by the decoder is the same as that obtained by the coder.

However, FIG. 6 also illustrates the problem of rupture of the synchronization between the decoder and the coder which can occur when, for example, the decoder increases the number of FGS refinement layers to decode during the video sequence, here for the image of index n.

Figure 7:
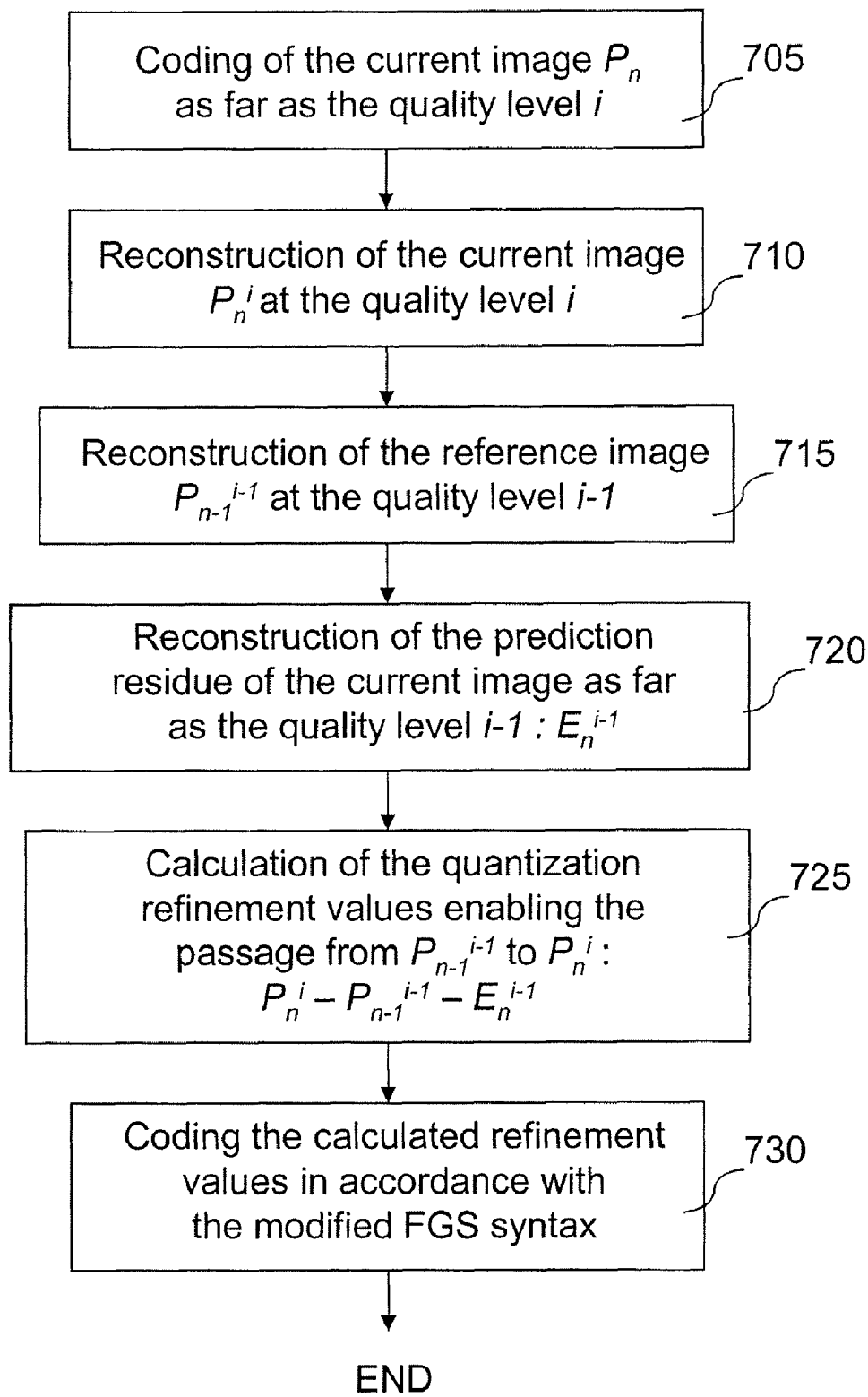
Figure 8:
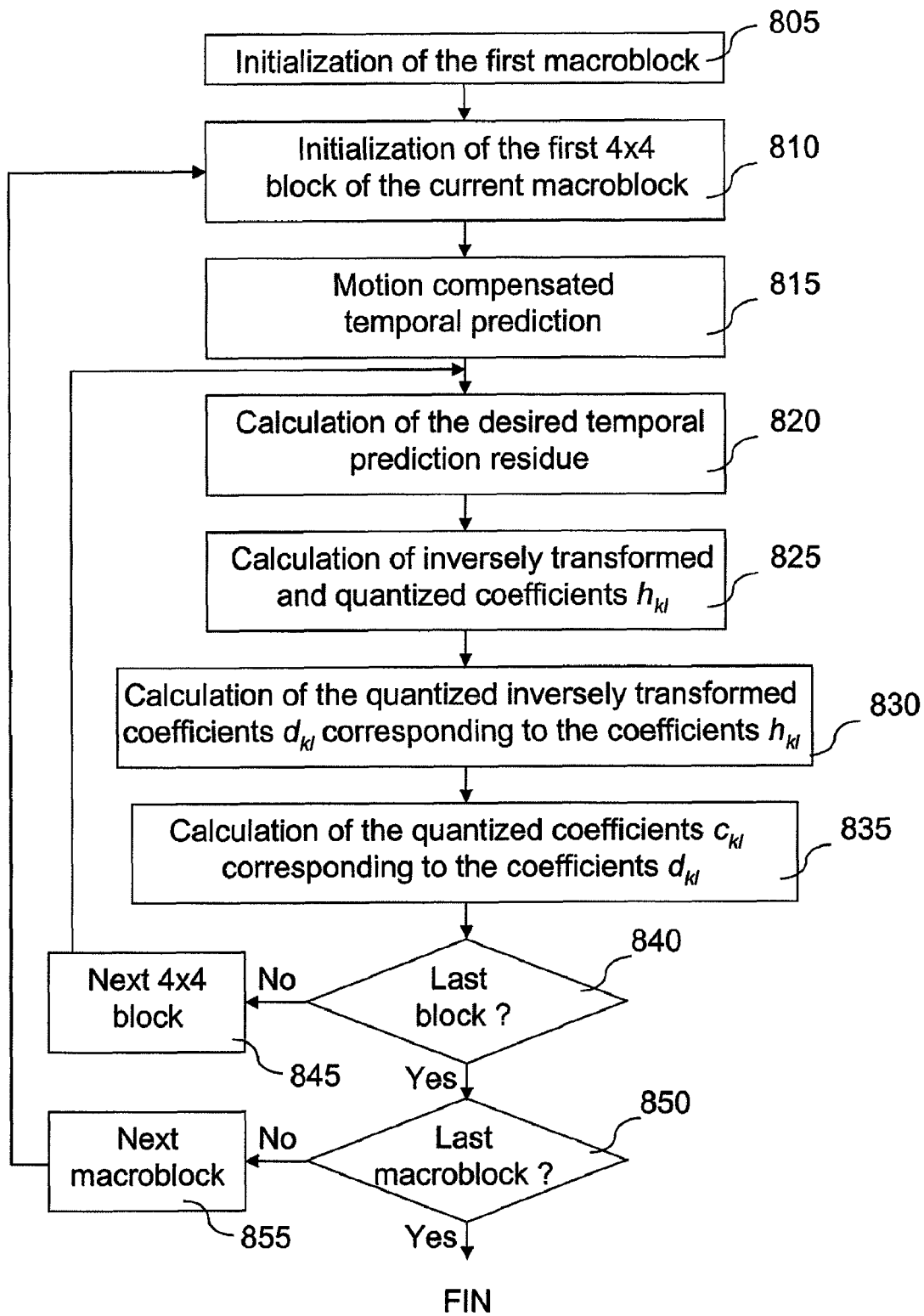

Although, in relation to FIGS. 6 to 8, a description is given of the case of the increase in the number of quality levels, the present invention applies equally well to the case of the reduction in the number of quality levels used.

This modification of the number of quality levels occurs, for example, in the case of an application of transmission with rate control in real time of an SVC stream which had been scalably compressed prior to any actual transmission.

FIG. 6 illustrates the example in which the decoder starts by decoding the video sequence as far as the quality level FGSi-1 then, starting with the image n, decodes the sequence at the quality level FGSi. The problem encountered by the decoder is then the following: it does not have the necessary compressed data for reconstructing the reference image of the image n as far as the intended quality level i corresponding to the layer FGSi. Consequently, the decoder does not have a reference image which is identical to the one, $P_{n-1}^{i}$, used at the time of the coding of the video sequence, for predicting the image $P_{n}^{i}$. The result of this is a loss of the synchronization between the decoder and the coder, which leads to a drop in quality, not only of the image of index n, but also of the following images reconstructed over an interval of several images, due to the temporal prediction loop implemented since the quality of the images reconstructed by the decoder after the increase in the number of $FGS_{i}$ layers transmitted is less than the quality of the images reconstructed by the coder at the FGSi quality level.

In the case of the use of the "leaky prediction" method, this drift is less, but still present.

The present invention aims to deal with this problem of drift, in particular in the case of the FGS coding and the closed loop motion compensation.

The invention is typically applied to the images of type P of the SVC compression system. However, the present invention is not limited to that type of image. It covers, among others, the coding of the images of type B, requiring a more complex implementation.

It is to be recalled that the images of type SP, specified in the H264/AVC video compression standard, make it possible to "skip" from one P image to another image P of the same video stream or of another video stream. This is adapted in particular to functionalities such as fast forward and rewind in a video sequence, robustness to errors, etc. These images of type SP may be viewed as a means for passing from an image P in a video stream at a given quality level to an image P of the same sequence at another quality level. However, their syntax and thus their decoding are not compatible with the current specification of the FGS technology of the new SVC standard.

Figure 1:
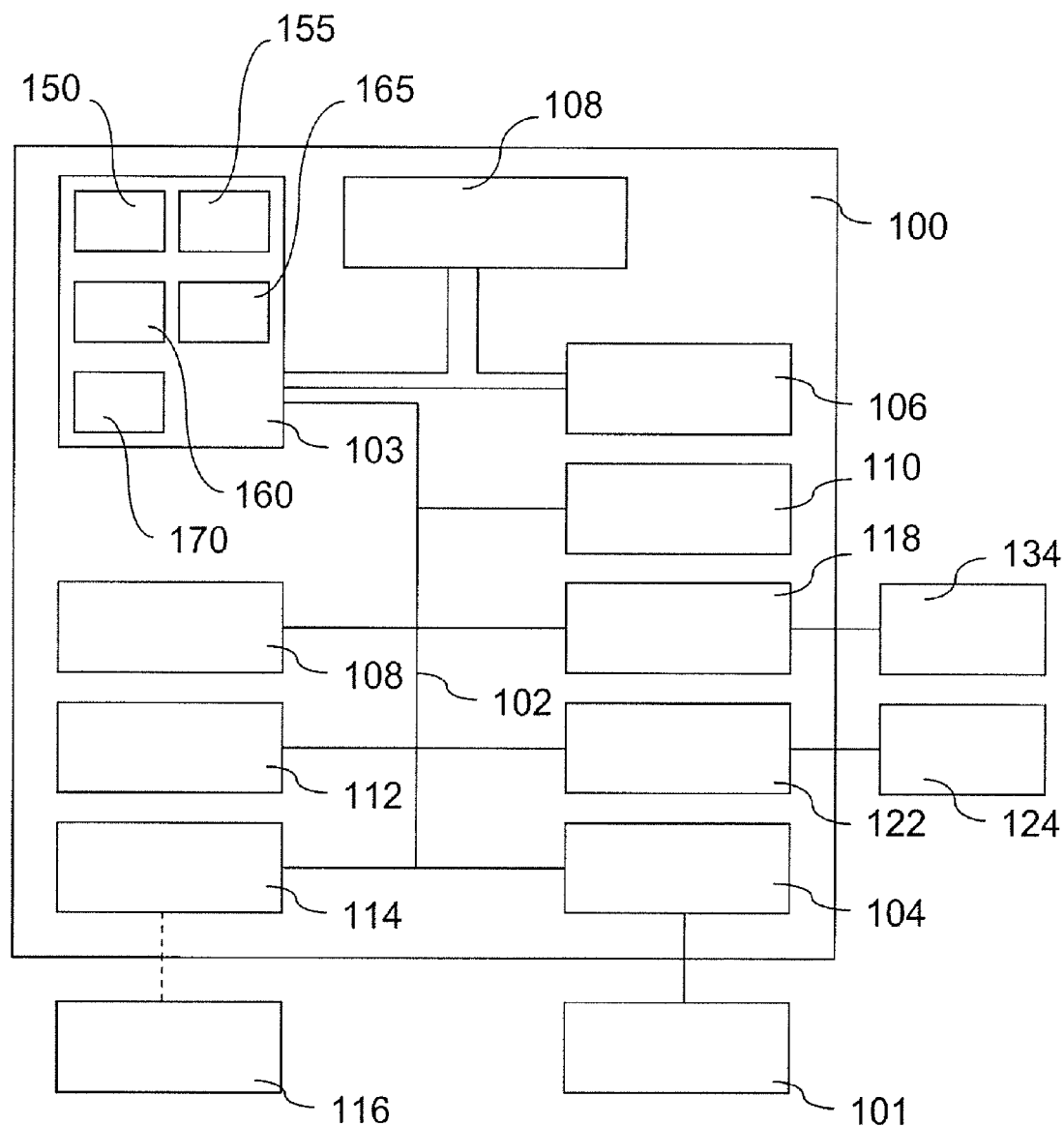

FIG. 1 shows a device or coder, 100, of the present invention, and different peripherals adapted to implement the present invention. In the embodiment illustrated in FIG. 1, the device 100 is a micro-computer of known type connected, through a graphics card 104, to a means for acquisition or storage of images 101, for example a digital moving image camera or a scanner, adapted to provide moving image images to compress.

The device 100 comprises a communication interface 118 connected to a network 134 able to transmit, as input, digital data to be compressed or, as output, data compressed by the device. The device 100 also comprises a storage means 112, for example a hard disk, and a drive 114 for a diskette 116.

The diskette 116 and the storage means 112 may contain data to compress, compressed data and a computer program adapted to implement the method of the present invention.

According to a variant, the program enabling the device to implement the present invention is stored in ROM (read only memory) 106. In another variant, the program is received via the communication network 134 before being stored.

The device 100 is connected to a microphone 124 via an input/output card 122. In this case, the data to code take the form of an audio signal. This same device 100 has a screen 108 for viewing the data to be decompressed (in the case of the client) or for serving as an interface with the user for parameterizing certain operating modes of the device 100, using a keyboard 110 and/or a mouse for example.

A CPU (central processing unit) 103 executes the instructions of the computer program and of programs necessary for its operation, for example an operating system. On powering up of the device 100, the programs stored in a non-volatile memory, for example the read only memory 106, the hard disk 112 or the diskette 116, are transferred into a random access memory RAM 108, which will then contain the executable code of the program implementing the method of the present invention as well as registers for storing the variables necessary for its implementation.

Naturally, the diskette 116 may be replaced by any type of removable information carrier, such as a compact disc, card or key memory. More generally, an information storage means, which can be read by a computer or by a microprocessor, integrated or not into the device, and which may possibly be removable, stores a program implementing the coding method of the present invention. A communication bus 102 affords communication between the different elements included in the device 100 or connected to it. The representation, in FIG. 1, of the bus 102 is non-limiting and in particular the calculation unit 103 unit may communicate instructions to any element of the device 100 directly or by means of another element of the device 100.

By the execution of the program implementing the method of the present invention, the central processing unit 103 constitutes the following means:
- a means 150 for coding an SVC video sequence with several quality layers of FGSi type above an SVC base layer (H264 compatible), or of spatial refinement or CGS type. This first means is applied to the original, i.e. non-compressed, video sequence. The function of this coding means is to generate compressed images with a base layer (H264 compatible SVC base layer, or else spatial refinement or CGS layer) and several FGSi refinement layers as specified in the FGS system in course of standardization;
- a first means 155 for inverse quantization of the current image at each quality level FGSi which would be decoded if the decoder was synchronized with the coder in that quality level. This quantization means is applied to the current image of type P after it has been completely coded (base layers and FGSi layers above). The function of this quantization means is to provide a version of the image of type P in course of being processed after inverse quantization at the intended quality level FGSi;
- a second means 160 for inverse quantization of both the reference image at a second quality level FGSj different from the quality level FGSi used by the first means for inverse quantization, as well as of the residual signal for the current image as far as the second quality level FGSj. This second inverse quantization means is applied to the compressed version of the reference image of the current image. It provides DCT coefficients of the reference image after inverse quantization at the second quality level FGSj as well as the DCT coefficients of the temporal prediction error signal reconstructed as far as the second quality level FGSj and
- a means 165 for subtraction between the version of the current image after inverse quantization in the DCT domain, and the sum of the reference image after inverse quantization at the second quality level FGSj and of the residual signal after inverse quantization as far as the second quality level FGSj. This subtraction means is applied to the versions after inverse quantization of the signals resulting from the first and second inverse quantization means. The subtraction means generates the discrete cosine transformation coefficients representing the texture refinement signal which will make it possible to decode, on the basis of the reference image reconstructed at the second quality level FGSj, the current image P at the first quality level FGSi;
- a means 170 for quantization and cyclic coding of the DCT coefficients and for insertion in the SVC bitstream of the residual signal arising from the subtraction performed by the subtraction means. This means finalizes the coding of the DCT coefficients of the texture refinement signal that were calculated by the subtraction means.

Texture refinement signals are thus inserted in the compressed SVC stream and, once transmitted and decoded, make it possible to increase or reduce the number of FGS quality layers decoded by the decoder during the video sequence, while ensuring identical reconstructed images, at the coder and at the decoder, during the video sequence.

The implementation of the present invention provides a better visual quality of the decoded images in the practical case of a transmission of a pre-coded SVC stream having fluctuations of the passband during the transmission of the video sequence.

The present invention is implemented solely by the coder 100, whereas the associated video decoding algorithm remains unaltered. The present invention consists of generating a texture refinement signal in accordance with the FGS technology specification in SVC, but enabling an image P to be reconstructed at a given FGS quality level, on the basis of a reference image reconstructed at a lower quality level.

To do this, the texture refinement signal is calculated by the coder so as to make it possible to reconstruct a temporal prediction error image which, once added to the reconstructed reference image at the lower level, reproduces a reconstructed image $P_n^i$ equal to that which would be reconstructed if the temporal prediction had been performed with the reference image $P_{n-1}^i$ reconstructed at the current FGS level.

To that end, the coder 100 codes then decodes the current image ($P_n$ in FIG. 6) at the intended quality level i, by using the reference image normally intended for that purpose, denoted $P_{n-1}^i$, which does not appear in FIG. 6 but which is assumed not to be available at the decoder. Next, the coder 100 reconstructs the temporal prediction residue by decoding the texture data of the image of temporal index n as far as the quality level FGSi-1. The prediction error signal arising from this last decoding is denoted $E_n^{i-1}$. In addition, the coder 100 reconstructs the reference image $P_{n-1}^i$ as far as the quality level FGSi. Next, the coder 100 calculates the difference between the reconstructed image $P_n^i$ and the sum of the reconstructed reference image $P_{n-1}^i$ and the prediction error signal $E_n^{i-1}$ in order to determine the texture refinement which must be coded in the refinement signal FGSi.

The differential signal corresponding to the difference calculated above, enables the decoder to reconstruct a temporal prediction error signal which, when added to the reconstructed reference image $P_{n-1}^{i-1}$, makes it possible to reconstruct the image $P_n^i$ identical to its version reconstructed at the coder 100. Thus, the synchronization between the decoder and the coder is maintained despite the increase in the number of FGS refinement layers decoded during the course of the sequence. The differential signal thus coded is denoted:

$$S_{(n-1,i-1)-(n,i)}$$

illustrating, by its two pairs of indices, that it makes it possible to pass from the reconstructed reference image $P_{n-1}^{i-1}$ to the reconstructed current image $P_n^i$.

As a variant, the determination of the differential texture refinement comprises a reconstruction of the current image by using the coded current image and each reconstructed reference image for the initial quality level to provide a hybrid reconstructed current image, and a determination of difference between the reconstructed current image at the intended quality value and the hybrid reconstructed current image, to determine the differential texture refinement. Preferably, the reconstruction of a hybrid reconstructed current image comprises a reconstruction of a temporal prediction error image for the current image, as far as the initial quality level, by using the reference image of the current image at the initial quality level.

FIG. 7 is a logigram representation of the steps implemented in a particular embodiment of the present invention for coding a texture refinement signal for an image $P_n$ at a given quality level FGSi. The data input at a first step 705 are the following:
  the current image $P_n$, in course of coding, or compression;
  the index i of the FGS quality layer for which a signal is required for passage from the quality layer i−i below.

The output of the last step 730 is the portion of compressed bitstream corresponding to the signal for passage from the reconstructed reference image $P_{n-1}^{i-1}$ to the current image at the quality level i: $P_n^i$.

During the step 705, the current image $P_n$ is coded as far as the quality level FGSi, that is to say the intended quality level for which it is sought to generate a passage signal, to provide a coded current image. This coding is performed in accordance with the conventional coding of a P image with FGS quality layers. Next, during a step 710, the current image $P_n$ is reconstructed at the intended quality level i, on the basis of the coded current image, to provide the reconstructed current image of intended quality level i, which the decoder will reconstruct using the reference image $P_{n-1}^{i-1}$ and the passage differential signal $S_{(n-1,i-1)-(n,i)}$.

It will be noted that an embodiment is described here in which a reference image is used but that the invention also applies when several reference images are used.

During a step 715, the reference image of the current image at the quality level i−1, denoted $P_{n-1}^{i-1}$, is decoded to provide a reconstructed reference image for the initial quality level. Next, during a step 720, the temporal prediction error signal for the current image of index n is reconstructed as far as the quality level FGSi-1, to provide the signal denoted $E_n^{i-1}$. During a step 725, calculation is made of the values of the FGS texture refinement coefficients of which the decoding will make it possible to pass from the reference image $P_{n-1}^{i-1}$ to the desired reconstructed image $P_n^i$. This step is detailed in FIG. 8, described below. The result of step 725 is a set of differential texture refinement coefficients depending on the reconstructed reference image for the initial quality level and on the reconstructed current image of intended quality level. These coefficients are next coded in accordance with the syntax of the FGS specification, during a step 730. For example, these coefficients comprise DCT coefficients, as set forth with reference to FIG. 8.

As a variant, several successive texture refinement differential signals can be coded making it possible to pass from one quality level to another over an interval of several images. In this case, for the coding of a differential texture refinement that is complementary with respect to the first, use is made as reference image (instead of the reference image $P_{n-1}^{i-1}$ of step 715) of the image reconstructed using the preceding differential texture refinement.

FIG. 8 is a representation, in logigram form, of the steps implemented for performing the step 725 illustrated in FIG. 7, to obtain the values of the coefficients constituting the desired passage signal which are coded during step 730. The input data of a first step 805 are the following:
  the reconstructed version of the current image $P_n^i$,
  the reconstructed reference image $P_{n-1}^{i-1}$ and
  the set of the coefficients already coded in the layers 0 to i−1 for the current image $P_n$, providing the signal $E_n^{i-1}$.

In this embodiment, the method of the present invention consists of going through each macroblock of address CurrMbAddr of the image. During step 805, the first macroblock is taken into consideration by attributing the value "0" to the index CurrMbAddr. For each macroblock CurrMbAddr in the current image, during a step 810, a temporal prediction is performed, including the decoding or the obtainment of the motion vectors associated with that macroblock then the reconstruction of a prediction signal of the current macroblock CurrMbAddr. This prediction signal takes the form of three tables, $pred_L$, $predc_b$, and $predc_r$ of reference samples for the temporal prediction of the macroblock CurrMbAddr.

Next, starting with a step 815, the macroblock partitions are gone through and possibly the partitions into sub-macroblocks of the macroblocks. More particularly, the block may be coded into a single 16×16 block (case of the INTRA__ 16×16 coding mode) or else may be cut up into partitions of 8×8 macroblock, and then possibly into sub-macroblock partitions, leading to 4×4 blocks of pixels. In the interest of simplicity and clarity, FIG. 8 only represents the case of the scanning of 4×4 blocks of luminance within each of the macroblocks of the image considered. Consequently, step 815 consists of initializing the index luma4×4Blkldx of the current 4×4 luminance block to 0.

During a step 820, calculation is made of the reconstructed coefficients of the residual 4×4 block making it possible to pass from its reference block in the image $P_{n-1}^{i-1}$ to the current block luma4×4Blkldx in the macroblock CurrMbAddr of the current image. This temporal prediction error block is such that the following relationship (1) is given, for any pair of integers k and l between 0 and 3 inclusive:

$$P_n^i[xP+xO+k, yP+yO+l] = \text{Clip1}(pred_L[xO+k, yO+l]+r_{kl}) \quad (1)$$

in which:
  $pred_L$ [ . . . , . . . ]" represents the reference block of the current block, to which a motion compensation process has been applied at step 810 to generate the predictor signal predL. The index L indicates that processing is currently being performed in the component of luminosity (or luma) of the current macroblock;
  xP and yP represent the coordinates of the upper left corner of the current macroblock CurrMbAddr;
  xO and yO represent the coordinates of the upper left corner of the current block luma4×4Blkldx within the current macroblock CurrMbAddr;
  the operation Clip1(x) consists of bringing the value x back between the bounds 0 and ($2^{BitDepth_Y}-1$) by clipping. The physical quantity BitDepthy is equal to the number of bits used to represent the values of luminance coefficients. For example, if BitDepthy has the value 8, this gives $(2^{BitDepthy}-1)=255$, thus the operation Clip1(x) consists of bringing the value x back into the interval [0, 255].

A reconstructed value $r_{kl}$ of temporal prediction residue coefficient is thus found which satisfies relationship (1) above. The set of coefficients $r_{kl}$ calculated by relationship (2) below is suitable for any pair of integers k and l between 0 and 3:

$$r_{kl}=P_n^i[xP+xO+k,yP+yO+l]-pred_L[xO+k,yO+l] \quad (2)$$

During a step 825, determination is made of the values of dequantized transformed coefficients $h_{kl}$ which correspond to the values $r_{kl}$ found above. More particularly, in accordance with section G.8.5.10 of the SVC specification in course of standardization, the coefficients $h_{kl}$ satisfy the following relationship:

$$r_{kl}=(h_{kl}+2^5)>>6. \quad (3)$$

Relationship (3) is satisfied on condition that the physical quantity $h_{kl}+2^5$ is between the values $(r_{kl}<<6)$ and $r_{kl}\times(2^7-1)$ inclusive. In other words, what is required is:

$$(r_{kl}<<6)-2^5 \leq h_{kl} < r_{kl}\times(2^7-1)-2^5 \quad (4)$$

To do this, it suffices to choose values of dequantized transformed coefficients $h_{kl}$ satisfying inequality (4) above.

Next, during a step 830, the quantized inversely transformed coefficients denoted $d_{kl}$ are sought which correspond to the coefficients $h_{kl}$. To be precise, the coefficients $h_{kl}$ are the result of an inverse transform which will be applied by the decoder to the passage signal in course of construction. Since the transform used in H264/AVC and SVC is reversible, is suffices to apply a direct transformation to the coefficients $h_{kl}$. This takes for example the form of a DCT with integer coefficients in the case of a coefficient of a 4×4 luma block (case of FIG. 8), for any pair of integers k and l between 0 and 3 inclusive:

$$(d_{kl}) = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \times h_{kl} \times \begin{bmatrix} 1 & 2 & 1 & 1 \\ 1 & 1 & -1 & -2 \\ 1 & -1 & -1 & 2 \\ 1 & -2 & 1 & -1 \end{bmatrix} \quad (5)$$

During a step 835, calculation is made of the quantized coefficient to code in the passage signal in course of construction, by applying a quantization operation such as specified in the document "J. Reichel, H. Schwarz, and M. Wien. *Joint Scalable Video Model JSVM 0*. Joint Video Team of ISO/IEC MPEG and ITU-T VCEG, Hong Kong, China, January 2005, document JVT-NO20" to the difference between the coefficients $d_{kl}$ and the values of the temporal prediction residual signal calculated previously, for any pair of integers k and l between 0 and 3 inclusive.

$$C_{kl}^i=\text{Quantization}(d_{kl}-E_n^{i-1}[xP+xO+k,yP+yO+l]) \quad (6)$$

This "quantization" function is implemented during a quantization step, known to the person skilled in the art.

According to a specific embodiment of the invention, the quantization step is not performed by the algorithm of FIG. 8, in order to code the desired differential passage signal without the least distortion. To do this, the DCT coefficients arising from the subtraction $d_{kl}-E_n^{i-1}[xP+xO+k,yP+yO+l]$ are provided as they are at the step of entropy encoding which normally follows the quantization step in the coding scheme illustrated in FIG. 7. This lossless coding, performed by omitting the quantization phase, makes it possible to exactly resynchronize the decoder with the coder during passage of the reconstructed reference image $P_{n-1}^{i-1}$ to the current reconstructed image $P_n^i$.

The operation performed according to equation (6) provides the transformed and quantized texture refinement coefficients to code in the targeted passage signal.

Next, during a step 840, it is determined whether the last sub-macroblock of the macroblock has been processed. If not, during a step 845, the following sub-macroblock is passed on to and the steps 820 to 835 are reiterated until all the sub-macroblock partitions of the current macroblock partition have been processed.

When all the macroblock partitions of the current macroblock CurrMbAddr have been processed, it is determined during a step 850 whether the last macroblock has been processed. If not, during a step 855, the following macroblock is passed on to and the steps 810 to 845 are reiterated on the other macroblocks of the current image $P_n$ until all the macroblocks of the current image have been processed, in which case the succession of steps is terminated.

To implement the present invention, a computer program is preferably implemented that can be loaded into a computer system, said program containing instructions enabling the implementation of the coding method as described above, when that program is loaded and executed by a computer system.

Figure 9:
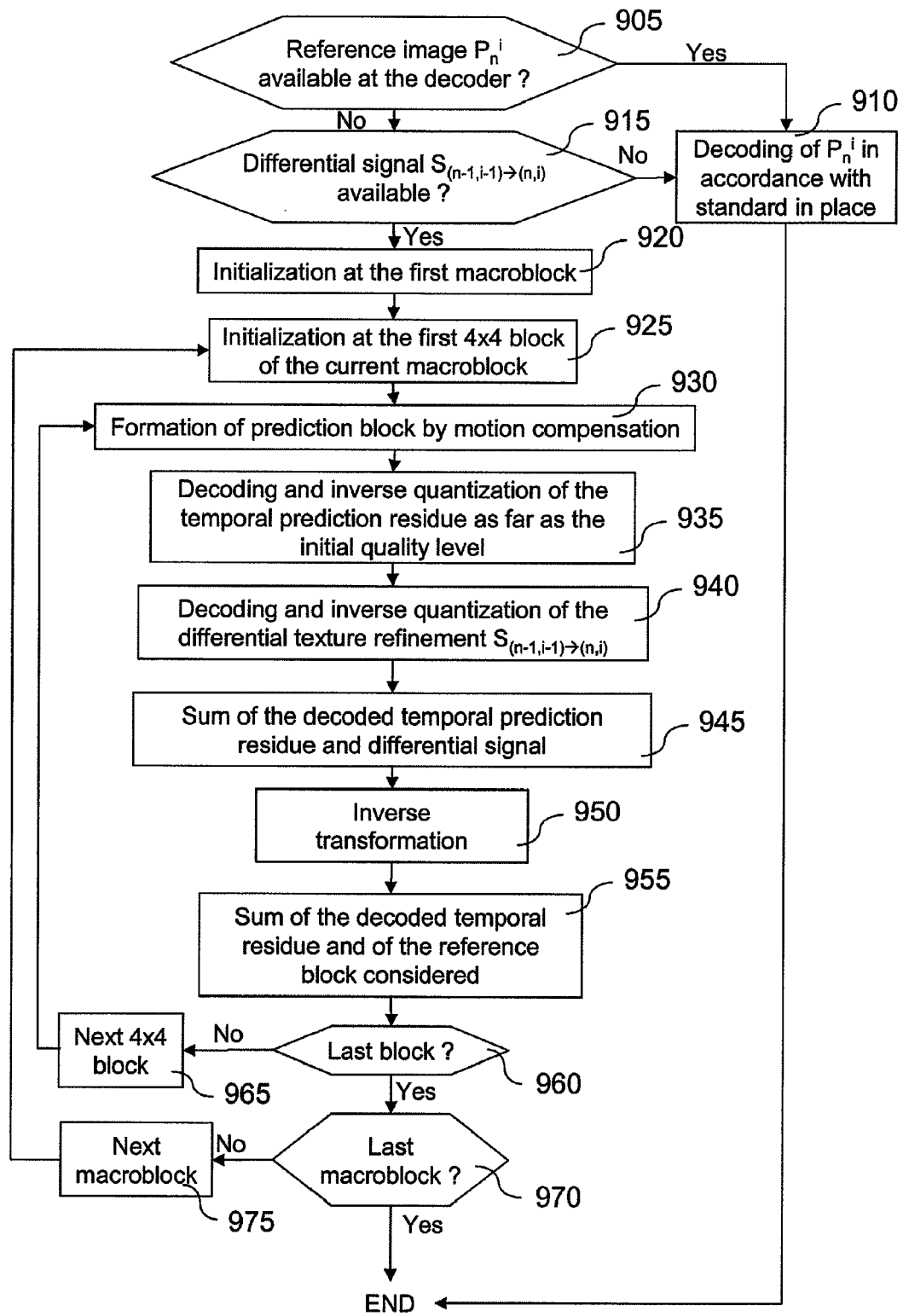

FIG. 9 illustrates the decoding method of the present invention, which uses, if it is available, the texture refinement differential signal introduced into the compressed bitstream by the implementation of the coding method illustrated in FIGS. 7 and 8.

The inputs to the algorithm of FIG. 9 are the following:
the current image $P_n$ to decode and
the intended quality level i at which it is desired to decode the current image $P_n$.

In order to be able to decode the image $P_n^i$ at the intended quality level of index i, the decoder must normally have available the reference image reconstructed at the intended quality level i in order to be able to perform the step of motion compensation in closed loop at the intended quality level i. During a step 905, it is determined whether the reference image $P_{n-1}^i$ is available. If yes, at a step 910, the decoding of the image $P_n^i$ is carried out in accordance with the closed loop FGS decoding known to the person skilled in the art. If no, during a step 915, it is determined whether a texture refinement differential signal $S_{(n-1,i-1)(n,i)}$ is available enabling the passage of the preceding reference image reconstructed at the quality level i-1 below to the current image reconstructed at the intended quality level, it being possible for that differential signal to be present in the bitstream to decode or received by the decoder. If no, during step 910, the decoding of the image $P_n^i$ is carried out using a reference image from the FGS quality level below, which leads to a loss of synchronization of the decoder with respect to the coder, and thus a loss of quality with respect to the intended quality level i. If yes, starting with a step 920, the decoder carries out the decoding of the image $P_n^i$ using the texture refinement differential signal.

In the interest of concision and simplicity, FIG. 9 provides a non-limiting illustration of the case in which the macroblocks of the current image are partitioned into sub-macroblock partitions of size 4×4, and only the processing of the luminance component has been represented. Generally, the decoding of the image $P_n^i$ then consists, for each 4×4 sub-macroblock partition, of carrying out a prediction of the current 4×4 block, step 935. This prediction (temporal or spatial) consists of forming a prediction block, denoted pred$_L$ of the current 4×4 block. Next, calculation is made of the prediction residue intended to be summed with the prediction block pred$_L$. This calculation consists of two steps:

- the decoding and progressive inverse quantization of the current 4×4 block as far as the quality level i−1, step 935 and
- The decoding and inverse quantization of the texture refinement differential signal, step 940.

The signals thus decoded are next summed, step 945, then a transformation (DCT with integer coefficients) is applied to the block resulting from that sum, step 950. This inverse transformation provides the progressively decoded temporal residue which is then summed with the prediction block predL calculated earlier, step 955. The block thus obtained then corresponds to a reconstructed block of the desired reconstructed image at the intended quality level.

To successively process the different macroblocks and blocks of the current image, during a step 920, the first macroblock is taken into account, which becomes the current macroblock. Next, during a step 925, the first 4×4 block of the current macroblock is taken into account to form the current block.

After step 955 described above, for each block, during a step 960, it is determined whether the current block is the last block of the current macroblock. If not, there is taken as current block the following current block in the current macroblock, step 965 and step 930 is returned to. If yes, during a step 970, it is determined whether the current macroblock is the last macroblock of the current image. If not, during a step 975, the following macroblock of the current image is taken as current macroblock and step 925 is returned to. If yes, the decoding of the current image is finished.

Thus, the method of scalable decoding of moving images, using at least one reference image for each image to decode and for each quality level, comprises, at least on passage, on the basis of the current image, from an initial quality level to an intended quality level different from the initial quality level:

- a step of decoding the differential texture refinement representing a difference between a reference image reconstructed for the initial quality level and the reconstructed current image of intended quality level and
- a step of reconstructing the current image at the intended quality level by using each reference image for the initial quality level and the differential texture refinement.

It is observed that the device for scalable decoding of moving images (not shown), for example a personal computer provided with a program implementing the decoding method illustrated in relation to FIG. 9 and using at least one reference image for each image to decode and for each quality level, comprises a decoding means, for example the central processing unit and the program, which decodes the differential texture refinement representing a difference between the reconstructed current image of intended quality level and the reconstructed reference image for the initial quality level. The decoding device also comprises a means for reconstructing the current image at the intended quality level, which uses each reference image for the initial quality level and the differential texture refinement, for example the central processing unit of the device provided with the computer program mentioned above.

A system for telecommunications between terminal devices connected via a telecommunications network comprises, according the present invention, at least one terminal device equipped with a coding device as described above and at least one terminal device equipped with a decoding device as described above.

Figure 10:
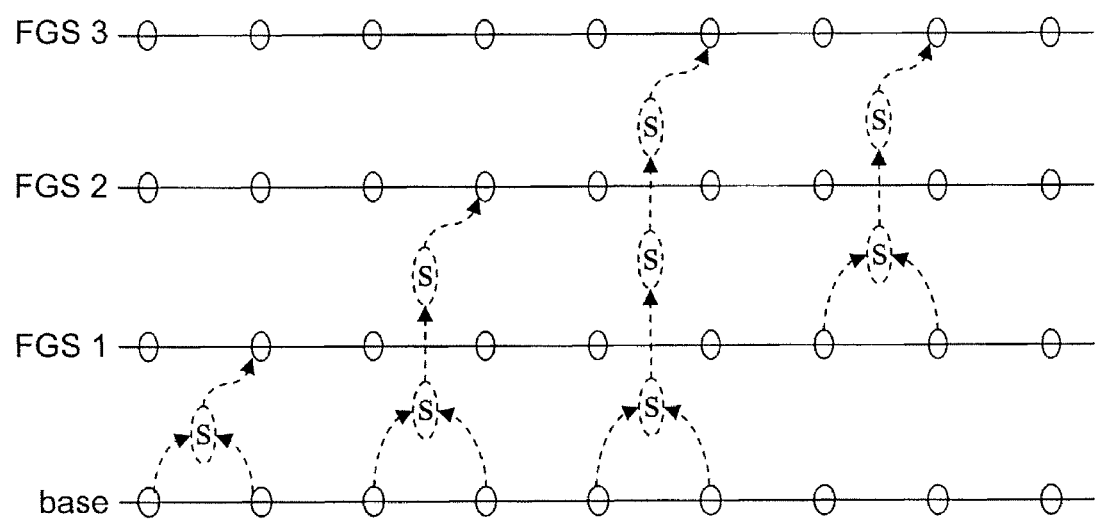
FIG. 10 illustrates the various switchings possible between FGS quality layers, by the use of FGS switches.

FIG. 10 illustrates the various switchings possible using such FGS switches. As shown by FIG. 10, this method can give rise to a switching signal making it pass from a quality level to any higher quality level.

To do this, when several FGS quality layers separate the initial quality level from the targeted level, then, in accordance with the FGS coding syntax, several switching slices are coded progressively and hierarchically. More precisely, several slices of the FGS type are successively coded in order to compress the residual signal issuing from the difference between the targeted reconstructed image at the targeted quality level and the prediction image calculated using the reference image reconstructed at the starting quality level. Throughout the remainder of the text, this differential texture signal is referred to as either "FGS switch", "PR switch" or "passage signal".

However, in the particular embodiment shown in FIGS. 1 to 9, if it is wished to provide a number of possibilities of switchings between FGS layers in an SVC bitstream, then it is necessary to code as many switching signals as there are switching operations that it is wished to enable. This involves a high number of switching signals added to an SVC bitstream, which substantially increases the size of the corresponding SVC file.

Figure 11:
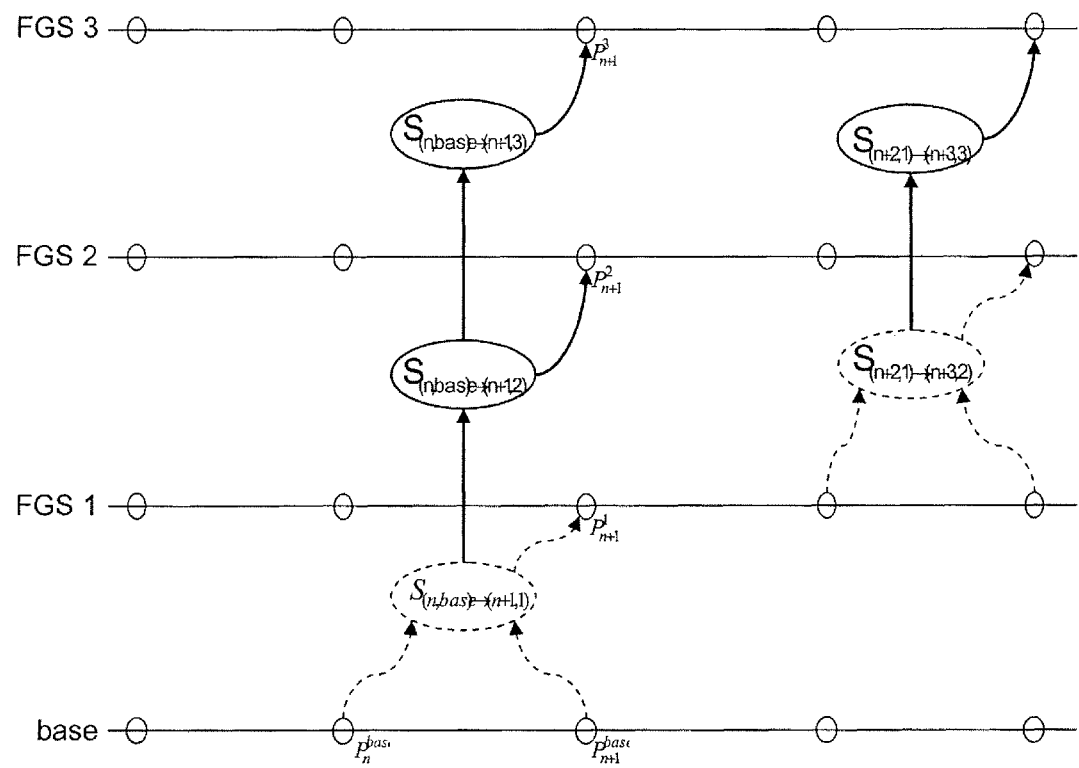
FIG. 11 illustrates the improvement proposed by the present invention, that is to say the various passage functionalities proposed simultaneously by the passage signals in a coding method according to the present invention, in a particular embodiment.
Figure 12:
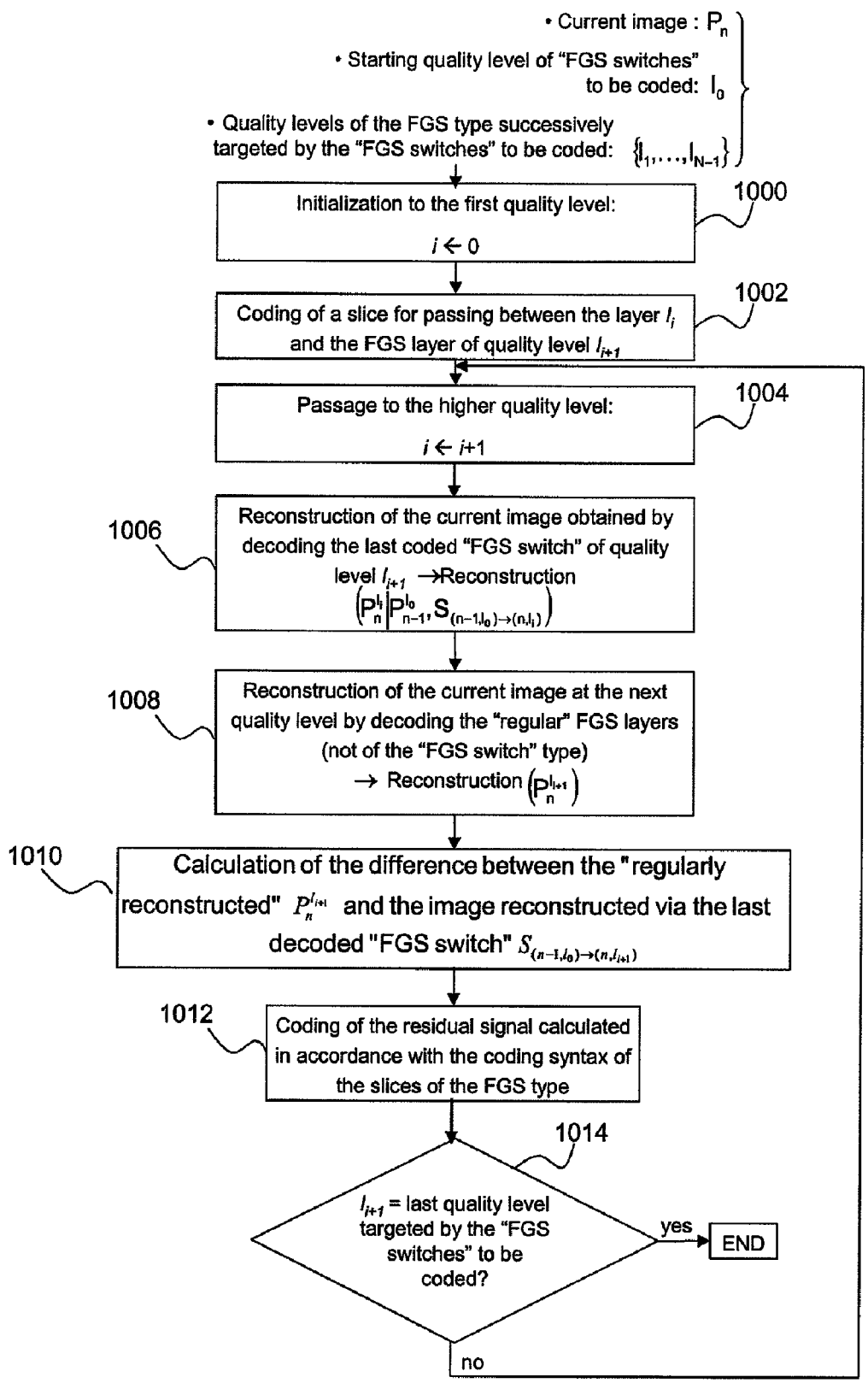
FIG. 12 is a flow diagram illustrating the main steps of a coding method according to the present invention, in a particular embodiment.

In the description of FIGS. 11 and 12, the terms "quality layer" and "quality level" are equivalent since a quality layer allows to pass from an image quality level to another, higher, image quality level.

FIG. 11 illustrates the principle of an improvement for coding signals of the "FGS switch" type or passage signals, so that these passage signals offer several possible passage functionalities. For example, the first hierarchy of FGS switches illustrated on the left in FIG. 11 represents a series of three FGS switches allowing passage from the base layer to any FGS layer amongst the three FGS layers coded on top of the base layer.

To do this, first of all a first signal of the FGS switch type is coded, to allow passage from the base layer to the first FGS refinement layer on top of the base layer. This first stage of the hierarchy of FGS switches is illustrated in dotted lines in FIG. 11 and is denoted $S_{(n,base) \to (n+1,1)}$.

Next, the higher FGS switches in the hierarchy, illustrated in solid lines, are coded in accordance with the present invention, as follows. To code the first FGS switch illustrated in solid lines, the image targeted by the previously coded FGS switch is reconstructed by decoding the latter. The reconstructed image is therefore an approximation of the following image $P_{n+1}^1$ which would be reconstructed by decoding the regular FGS layer denoted FGS 1 in FIG. 11.

The coding of the next signal of the FGS switch type consists of now taking as the target image the reconstructed image $P_{n+1}^2$, that is to say the following image reconstructed at the next FGS quality level. There is therefore formed the difference between this new target image and the image reconstructed via the decoding of the last coded FGS switch $S_{(n,base) \to (n+1,1)}$. This difference then constitutes the new residual signal to be compressed. Its compression is performed by implementing a coding in accordance with the FGS syntax. The signal thus coded, denoted $S_{(n,base) \to (n+1,2)}$, is inserted in the SVC bitstream as a refinement of the coded texture signal in the previous FGS switch $S_{(n,base) \to (n+1,1)}$. It is therefore coded with a quantization step divided by two with respect to the quantization step used in the switch signal $S_{(n,base) \to (n+1,1)}$.

The above coding operation, supplying the passage signal between FGS layers $S_{(n,base) \to (n+1,2)}$, is then reiterated in a similar fashion for coding the third passage signal $S_{(n,base) \to (n+1,3)}$ of the series of FGS switches in the course of construction.

The main steps of coding, in accordance with the present invention, passage signals from an initial quality layer to several quality layers of the FGS type higher than the initial layer are illustrated in FIG. 12, in a particular embodiment.

At the entry to the first step 1000, there are:
the current image $P_n$ currently being processed, in which it is attempted to insert passage signals from the previous image $P_{n-1}$;
the initial quality level of the passage signals to be coded $l_0$;
all the quality levels targeted by the passage signals that will be generated by the algorithm: $\{l_1, \ldots, l_{N-1}\}$, where N represents a natural integer greater than or equal to 1.

The first position adopted is at the starting quality level specified at the entry to the algorithm. In coding the passage signals, the level $l_i$, where i=0, will be taken as the starting quality level.

The following step 1002 consists of coding, in accordance with the technique disclosed in the embodiment of FIGS. 1 to 9, a first passage signal, that is to say of the "FGS switch" type, between the image $P_{n-1}$ reconstructed at the quality level $l_0$ and the current image $P_n$ reconstructed at the first quality level targeted by the "FGS switches" currently being coded: $l_1$.

Once this first passage signal is coded and inserted in the SVC bitstream currently being constructed, the next quality level is passed to by incrementing, at step 1004, the quality layer index i.

The following step 1006 consists of restoring the current image $P_n$ in its reconstructed version when the coding process uses the last "FGS switch" coded by the algorithm. This reconstruction step is denoted Reconstruction($P_n|P_{n-1}^{l_0}$, $S_{(n-1,l_0) \to (n,l_i)}$). This is because this reconstruction is based on the data of the reconstructed image and of the passage signal $P_{n-1}^{l_0}$, and attempts to provide a reconstruction of the current image $P_n$ as close as possible to its regularly reconstructed version $P_n^{l_i}$, which would be obtained if the regular FGS layer of quality level $l_i$ were decoded.

The purpose of the rest of the algorithm is to change the target image for the next passage signal to be coded, now taking as the target the image $P_n$ reconstructed at the next quality level $l_{i+1}$. Thus the following step 1008 consists of supplying the reconstructed version of the current image $P_n$ obtained by decoding the regular FGS layers as far as the quality level $l_{i+1}$. This step is denoted Reconstruction($P_n^{l_{i+1}}$).

There is then available, by virtue of these last two reconstruction steps, firstly the image targeted by the next passage signal to be coded and secondly the starting reconstructed image on which the next passage signal to be coded will be based. At the following step 1010, a texture residue signal equal to the difference between the reconstructed image currently targeted and the reconstructed starting image in question is formed.

This difference supplies the texture residue to be coded, during the following step 1012, in accordance with the coding system of the FGS type as defined in the SVC standard, in order to form the next required coded passage signal denoted $S_{(n-1,l_0) \to (n,l_{i+1})}$.

This signal is coded and inserted in the SVC bitstream in the course of construction.

It should be noted that each passage signal is coded with a quantization step divided by $2^p$ with respect to the quantization step used in the previous passage signal, p designating the number of successive quality layers between the higher quality layer and the current layer.

Once this coding has been carried out, a test is carried out, during a test 1014, to determine whether the last quality level to which it is wished to code the passage signal has been reached. If such is the case (test 1014 positive), the algorithm ends. Otherwise (test 1014 negative), the next quality level is passed to by incrementing the index $l_i$ of the quality levels to which the passage signals in the course of coding relate (return to step 1004). The previously described steps are then repeated, from the step 1006 of reconstructing the current image via the decoding of the last coded passage signal.

The invention claimed is:

1. A method of scalable coding of moving images using at least one reference image for at least one image to code, the method comprising:
    when a previous image of an initial quality level passes to a current image of an intended quality level different from the initial quality level and superior to the initial quality level:
    a first coding step of coding the current image as far as the intended quality level to provide a coded current image,
    a reconstructing step of reconstructing the current image at the intended quality level by using the coded current image and at least one reference image for the intended quality level, to provide a reconstructed current image of intended quality level,
    an obtaining step of obtaining at least one reference image of the current image at the initial quality level, to provide a reconstructed prediction image for the initial quality level,
    a determining step of determining a differential texture refinement depending on the reconstructed prediction image for the initial quality level and on the reconstructed current image of intended quality level, and
    a second coding step of coding the differential texture refinement.

2. A method according to claim 1, wherein the step of determining the differential texture refinement comprises:
    a step of reconstructing a prediction residue of the current image as far as the initial quality level; and
    a step of determining a difference between the current image reconstructed at the intended quality level, and the sum of the reconstructed prediction image at the initial quality level and said residue.

3. A method according to claim 1, wherein the step of determining the differential texture refinement comprises:
    a step of reconstructing the current image by using said coded current image and each reconstructed prediction image for the initial quality level, to provide a hybrid reconstructed current image; and
    a step of determining a difference between the reconstructed current image at the intended quality level and the hybrid reconstructed current image, for determining a differential texture refinement.

4. A method according to claim 3, wherein the step of reconstructing a hybrid reconstructed current image comprises a step of reconstructing a temporal prediction error image for the current image as far as the initial quality level by using the reference image of the current image at the initial quality level.

5. A method according to claim 1, further comprising a step of temporal prediction during the first coding step of coding the current image, during the reconstructing step and during the obtaining step.

6. A method according to claim 5, wherein said temporal prediction step includes a step of obtaining motion vectors associated with macroblocks of the image and a step of motion compensation of the associated reference macroblocks.

7. A method according to claim 1, wherein the obtaining step of obtaining the prediction image comprises a step of obtaining motion vectors associated with macroblocks of the current image and a step of motion compensation for the macroblocks of each prediction image at the initial quality level.

8. A method according to claim 1, wherein, during the second coding step of coding the texture refinement, a texture refinement signal is coded using coding compatible with the FGS coding syntax specified in the draft SVC standard.

9. A method according to claim 1, wherein, during the second coding step of coding the texture refinement, the texture refinement code comprises discrete cosine transformation coefficients representing said texture refinement.

10. A method according to claim 1, further comprising a step of transmitting, from a coder to a decoder, the texture refinement code, said transmitting step only being performed at the time of an increase or reduction in the number of quality levels transmitted.

11. A method according to claim 1, further comprising steps according to which, for at least one current quality level ($l_i$) of a plurality of quality levels ($l_1, \ldots, l_{N-1}$) higher than the initial quality level ($l_0$), each quality level in the plurality of quality levels containing solely progressive refinement data of the texture information:
   (a) the last coded passage signal is decoded, so as to obtain a residual signal, and the current image is reconstructed by adding the residual signal and its associated prediction image;
   (b) the current image is reconstructed by decoding a quality level ($l_{i+1}$) higher than the current quality level ($l_i$);
   (c) the difference between the current image reconstructed at step (a) and the current image reconstructed at step (b) is calculated, so as to obtain residual data;
   (d) said residual data is coded so as to obtain a signal for passing between the initial quality level ($l_0$) and the quality level ($l_{i+1}$) higher than the current quality level.

12. A method according to claim 11, wherein steps (a) to (d) are performed for each current quality level ($l_i$) of the plurality of the quality levels ($l_1, \ldots, l_{N-1}$).

13. A method according to claim 11, wherein said quality level ($l_{i+1}$) higher than the current quality level ($l_i$) is directly higher than the current quality level.

14. A method according to claim 11, wherein each passage signal is coded with a quantization step divided by $2^P$ with respect to the quantization step used in the previous passage signal, where p is the number of successive quality levels between the higher quality level and the current level.

15. A method according to claim 11, wherein said hierarchical coding is in accordance with the SVC (Scalable Video Coding) standard and the quality levels in said plurality of quality levels ($l_1, \ldots, l_{N-1}$) are refinement quality levels of the FGS (Fine Grain Scalability) type.

16. A device for scalable coding of moving images using at least one reference image for at least one image to code, which comprises:
   a first coding unit constructed to, when a previous image of an initial quality level passes to a current image of an intended quality level different from the initial quality level and superior to the initial quality level, code the current image as far as the intended quality level to provide a coded current image,
   a reconstruction unit constructed to reconstruct the current image at the intended quality level by using the coded current image and at least one reference image for the intended quality level, to provide a reconstructed current image of intended quality level,
   an obtaining unit constructed to obtain at least one reference image of the current image at the initial quality level, to provide a reconstructed prediction image for the initial quality level,
   a determination unit constructed to determine a differential texture refinement depending on the reconstructed prediction image for the initial quality level and on the reconstructed current image of intended quality level; and
   a second coding unit constructed to code the differential texture refinement.

17. A device according to claim 16, wherein the first coding unit is further constructed to code a video sequence with several quality levels, and wherein the device further comprises a refinement unit comprising:
   a first inverse unit constructed to perform an inverse quantization of the current image at each quality level which would be decoded if the decoder was synchronized with the coder in that quality level,
   a second inverse unit constructed to perform an inverse quantization of the reference image at a second quality level different from the quality level used by the first inverse unit and to perform an inverse quantization of the residual signal for the current image as far as the second quality level,
   a subtraction unit constructed to subtract between the version of the current image after inverse quantization by the first inverse unit, and the sum of the reference image after inverse quantization at the second quality level and of the residual signal after inverse quantization as far as the second quality level, and
   a quantization and coding unit constructed to perform quantization and coding of data arising from the first inverse quantization performed by the first inverse unit and for inserting into the code said data of a residual signal arising from the subtraction performed by the subtraction unit.

18. A device according to claim 16, further comprising processing unit constructed, for at least one current quality level ($l_i$) in a plurality of quality levels ($l_1, \ldots, l_{N-1}$) higher than the initial quality level ($l_0$), each quality level in the plurality of quality levels containing solely progressive refinement data of the texture information:
   (a) to decode the last coded passage signal, so as to obtain a residual signal, and to reconstruct the current image by adding the residual signal and its associated reconstructed prediction image;
   (b) to reconstruct the current image by decoding a quality level ($l_{i+1}$) higher than said current quality level ($l_i$);
   (c) to calculate the difference between the current image reconstructed at step (a) and the current image reconstructed at step (b), so as to obtain residual data;
   (d) to code said residual data, so as to obtain a passage signal between the initial quality level ($l_0$) and the quality level ($l_{i+1}$) higher than the current quality level.

19. A device according to claim 18, wherein the processing unit constructed to perform operations (a) to (d) is further constructed to perform these operations for each current quality level (I) in the plurality of quality levels ($l_1, \ldots, l_{N-1}$).

20. A device according to claim 18, wherein said quality level ($l_{i+1}$) higher than the current quality level ($l_i$) is directly higher than the current quality level.

21. A device according to claim 18, wherein each passage signal is coded with a quantization step divided by $2^p$ with respect to the quantization step used in the previous passage signal, where p is the number of successive quality levels between the higher quality level and the current quality level.

22. A device according claim 18, wherein said hierarchical coding is in accordance with the SVC (Scalable Video Coding) standard and the quality levels in said plurality of quality levels ($l_1, \ldots l_{N-1}$) are refinement quality levels of the FGS (Fine Grain Scalability) type.

23. A method of scalable decoding of moving images using at least one reference image for at least one image to decode, the method comprising:
when a previous image of an initial quality level passes to a current image of an intended quality level different from the initial quality level and superior to the initial quality level:
a step of decoding a differential texture refinement representing a difference between a reconstructed prediction image for the initial quality level and the reconstructed current image of intended quality level, and
a step of reconstructing the current image at the intended quality level by using at least one reference image for the initial quality level and the differential texture refinement.

24. A method according to claim 23, wherein the step of reconstructing the current image comprises a step of decoding and of inverse quantization of a temporal prediction residue as far as the initial quality level.

25. A method according to claim 23, wherein the step of reconstructing the current image comprises a step of decoding and of inverse quantization of the differential texture refinement.

26. A method according to claim 23, wherein the step of reconstructing the current image comprises a step of decoding and of inverse quantization of a temporal prediction residue as far as the initial quality level, a step of decoding and of inverse quantization of the differential texture refinement, and a step of adding the temporal prediction residue and the decoded differential signal.

27. A method according to claim 26, wherein the step of reconstructing the current image comprises a step of inverse transformation of the result of said adding step to provide a decoded temporal residue.

28. A method according to claim 27, wherein the step of reconstructing the current image comprises a step of adding the decoded temporal residue and the corresponding reference block.

29. A device for scalable decoding of moving images using at least one reference image for at least one image to decode, that comprises:
a decoding unit constructed to, when a previous image of an initial quality level passes to a current image of an intended quality level different from the initial quality level and superior to the initial quality level, decode a differential texture refinement representing a difference between a reconstructed current image of intended quality level and a reconstructed prediction image for the initial quality level, and
a reconstruction unit constructed to reconstruct the current image at the intended quality level by using at least one reference image for the initial quality level and the differential texture refinement.

30. A telecommunications system comprising a plurality of terminal devices connected via a telecommunications network, that comprises at least one terminal device equipped with a coding device according to any one of claims 16 to 22 and at least one terminal device equipped with a decoding device for scalable decoding of moving images using at least one reference image for at least one image to decode, said decoding device comprising:
a decoding unit constructed to, when a previous image of an initial quality level passes to a current image of an intended quality level different from the initial quality level and superior to the initial quality level, decode a differential texture refinement representing a difference between a reconstructed current image of intended quality level and a reconstructed prediction image for the initial quality level, and
a second reconstruction unit constructed to reconstruct the current image at the intended quality level by using at least one reference image for the initial quality level and the differential texture refinement.

31. A non-transitory computer-readable storage medium retrievably storing a computer-executable program that can be loaded into a computer system, said program containing instructions enabling the implementation of the coding method according to any one of claims 1 to 15, when that program is loaded and executed by a computer system.

32. A non-transitory computer-readable storage medium retrievably storing a computer-executable program that can be loaded into a computer system, said program containing instructions enabling the implementation of the decoding method according to any one of claims 23 to 28, when that program is loaded and executed by a computer system.

* * * * *